(12) United States Patent
Takahashi et al.

(10) Patent No.: US 6,852,399 B2
(45) Date of Patent: Feb. 8, 2005

(54) DECORATIVE MATERIAL

(75) Inventors: Kazuhiro Takahashi, Shinjuku-Ku (JP); Kimio Ito, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/508,604

(22) PCT Filed: Jul. 14, 1999

(86) PCT No.: PCT/JP99/03806

§ 371 (c)(1),
(2), (4) Date: Mar. 14, 2000

(87) PCT Pub. No.: WO00/03874

PCT Pub. Date: Jan. 27, 2000

(65) Prior Publication Data

US 2003/0113520 A1 Jun. 19, 2003

(30) Foreign Application Priority Data

| Jul. 14, 1998 | (JP) | 10-214919 |
| Sep. 10, 1998 | (JP) | 10-256950 |
| Oct. 29, 1998 | (JP) | 10-308431 |
| Nov. 2, 1998 | (JP) | 10-311618 |
| Nov. 20, 1998 | (JP) | 10-330285 |

(51) Int. Cl.$^7$ .............................................. B32B 7/02
(52) U.S. Cl. ................... 428/213; 428/189; 428/199; 428/219; 428/220; 428/207; 428/195
(58) Field of Search ............................ 428/204, 156, 428/213, 219, 220, 189, 199, 200, 207, 195

(56) References Cited

U.S. PATENT DOCUMENTS

| 4,087,400 A | * | 5/1978 | Skinner | 260/30.4 N |
| 4,916,007 A | * | 4/1990 | Manning et al. | 428/203 |
| 5,665,457 A | * | 9/1997 | Sato et al. | 428/195 |
| 6,040,044 A | * | 3/2000 | Takahashi et al. | 428/323 |

FOREIGN PATENT DOCUMENTS

| JP | 60-12106 | 3/1985 |
| JP | 64-64834 | 3/1989 |
| JP | 07 186514 A | 7/1995 |

OTHER PUBLICATIONS

Patent Abstracts of Japan, 1995, No. 10, Nov. 30, 1995.

* cited by examiner

*Primary Examiner*—Merrick Dixon
(74) *Attorney, Agent, or Firm*—Parkhurst & Wendel, L.L.P.

(57) ABSTRACT

A decorative material is provided which particularly possesses excellent adhesion properties. The decorative material comprises: a substrate; a print layer provided on the substrate; a protective layer provided on the print layer, the protective layer comprising an ionizing radiation-cured resin; and a stress relaxing layer as a primer layer provided between the print layer and the protective layer, for relaxing shrinkage stress caused at the time of curing of an ionizing radiation-curable resin for the formation of the ionizing radiation-cured resin constituting the protective layer.

39 Claims, 4 Drawing Sheets

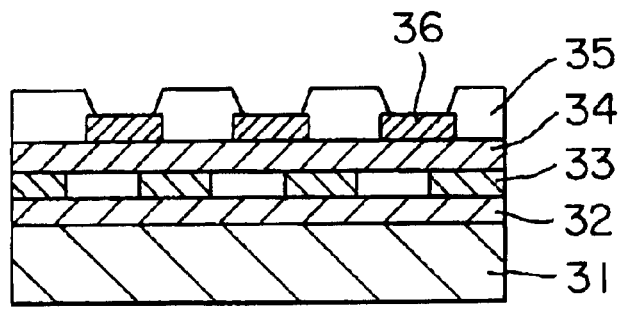
F I G. 4
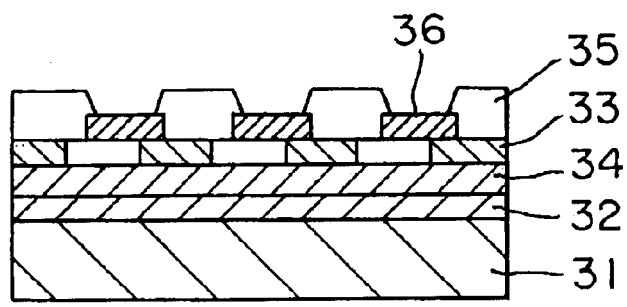
F I G. 5
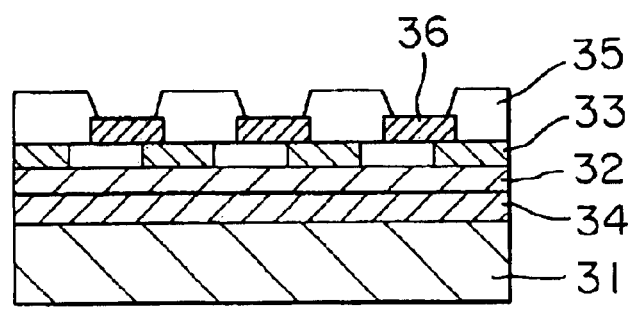
F I G. 6

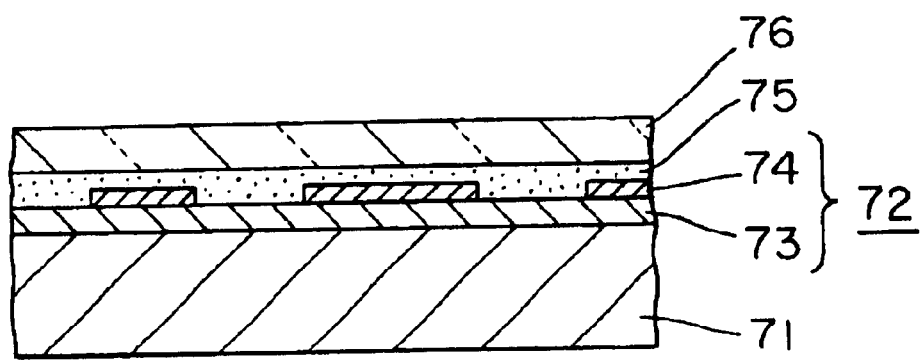
F I G. 7
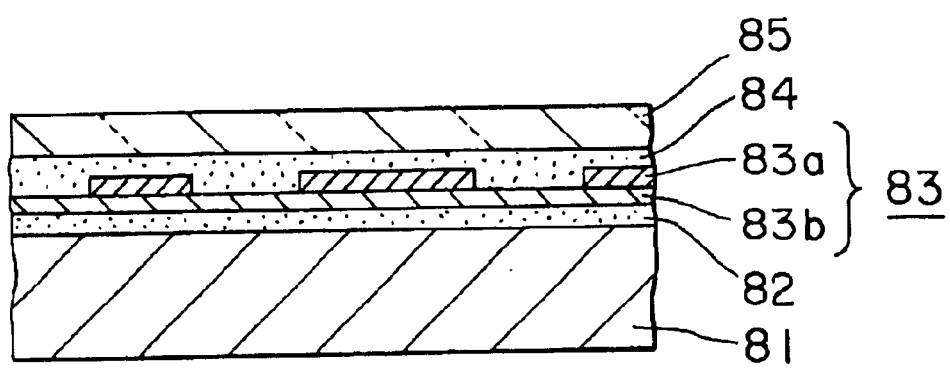
F I G. 8

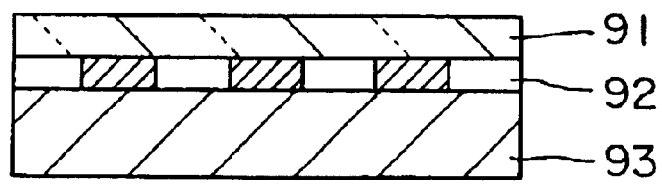
F I G. 9
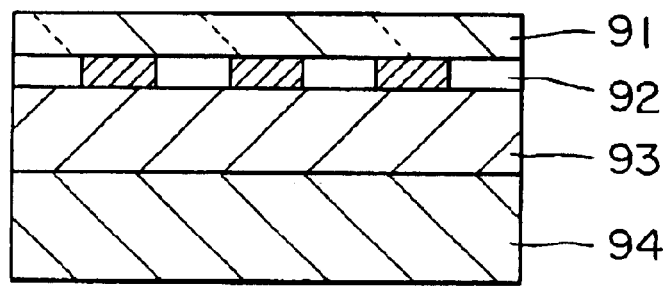
F I G. 10
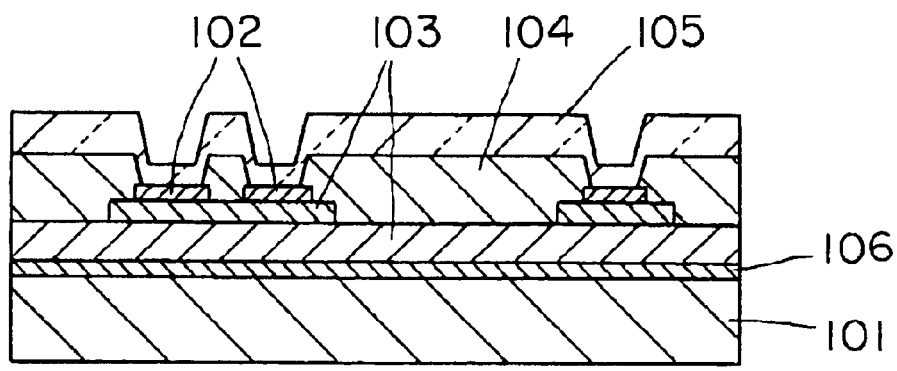
F I G. 11

DECORATIVE MATERIAL

TECHNICAL FIELD

The present invention relates to a decorative sheet, which can be used, for example, in interior decoration of buildings, surface decoration of fittings, and surface decoration of upholstery in vehicles, and has excellent design effect, and a decorative material such as a decorative plate.

BACKGROUND OF THE INVENTION

One example of conventional decorative sheets is such that a protective layer formed of an ionizing radiation-cured resin, such as an electron beam-cured resin, is provided. In this type of decorative sheets, a pattern, such as a woodgrain pattern, is provided on the surface of a substrate sheet, such as paper, an olefin resin, or a vinyl chloride resin, and a protective layer formed of an electron beam-cured resin or the like is provided on the surface of the pattern. In general, such decorative sheets are applied, for example, as interior materials for fittings or buildings, to particle boards, plywoods, plastic members, or other substrates for decorative plates, and then used as decorative plates.

In conventional decorative sheets provided with a protective layer formed of an ionizing radiation-cured resin, the ionizing radiation-cured resin has a regulated crosslink molecular weight. In general, molecular weight between crosslinks or average crosslink molecular weight is used as an index of the crosslink molecular weight. For conventional electron beam-cured resins, for example, the average molecular weight between crosslinks is set to 150 to 1,000, more preferably 200 to 1,000, still more preferably 250 to 800. In this case, the average molecular weight between crosslinks is determined by the following equation:

Average molecular weight between crosslinks=molecular weight of whole resin (m)/number of crosslink points In this equation, the molecular weight of the whole resin is $\Sigma$ (number of moles of each component incorporated × molecular weight of each component), and the number of crosslink points is $\Sigma[2(\text{number of functional groups in each component} -1) \times \text{number of moles of each component}]$.

When the average molecular weight between crosslinks exceeds 1,000, the whole resin is excessively soft. In this case, high hardness characteristic of electron beam-cured resins is lost, posing a problem of scratch resistance of the protective layer in its surface. Even though the average molecular weight between crosslinks is 250 to 800, which has been regarded as a preferred molecular weight range for the conventional protective layer, for example, a protective layer having an average molecular weight between crosslinks of about 800 close to the upper limit value poses a problem of resistance to staining. In this case, in a test on resistance to staining, a contaminant is likely to be left on the surface of the protective layer. On the other hand, when the average molecular weight between crosslinks is brought to not more than 200, the resistance of the protective layer to staining is significantly improved. The reason for this is that the hardness of the protective layer in its surface has been increased by virtue of an increase in proportion of the functional group to the molecular weight. This enables the amount of the contaminant left on the surface to be reduced. When the average molecular weight between crosslinks is not more than 200, the electron beam-curable resin coheres at the time of curing, unfavorably leading to a failure of the print layer of a woodgrain pattern or the like underlying the protective layer. Consequently, a failure of adhesion occurs. In particular, when the ink composition constituting the print layer contains a large amount of a pigment, the separation between layer is likely to occur.

The present invention has been made with a view to solving the above problems of the prior art, and it is an object of the present invention to provide a decorative material which has a protective layer possessing excellent resistance to staining and does not cause a problem of a failure of adhesion or the like.

DISCLOSURE OF THE INVENTION

First Aspect of Invention

According to a first aspect of the present invention, there is provided a decorative material comprising:

a substrate;

a print layer provided on the substrate;

a protective layer provided on the print layer, the protective layer comprising an ionizing radiation-cured resin; and a stress relaxing layer as a primer layer provided between the print layer and the protective layer, for relaxing shrinkage stress caused at the time of curing of an ionizing radiation-curable resin for the formation of the ionizing radiation-cured resin constituting the protective layer.

The primer layer preferably has a thickness of 1 to 5 $\mu$m.

According to a preferred embodiment of the present invention, the ionizing radiation-cured resin has an average molecular weight between crosslinks of 100 to 200.

Further, according to a preferred embodiment of the present invention, the ionizing radiation-cured resin is an electron beam-cured resin.

According to a preferred embodiment of the present invention, for the primer layer, the yield strength is not less than 0.6 kgf, more preferably 0.6 to 3.0 kgf, and the breaking strength is not less than 1.0 kgf, more preferably 1.0 to 4.0 kgf. The yield strength and the breaking strength are measured in such a manner that two biaxially stretched polyethylene terephthalate film strips having a thickness of 50 $\mu$m and a width of 10 mm are laminated on top of the other through a 3 $\mu$m-thick primer layer so as for the end of one of the strips to overlap with the end of the other strip by 10 mm and, in this state, the two biaxially stretched polyethylene terephthalate film strips are pulled at a temperature of 70° C. in opposite directions.

According to another preferred embodiment of the present invention, the protective layer has a maximum temperature, at which the protective layer can withstand, of 170° C.

According to another preferred embodiment of the present invention, the top coat has a maximum temperature, at which the top coat can withstand, of 170° C.

According to still another preferred embodiment of the present invention, the decorative material has a surface gloss of not less than 90 as measured with a Gardner 75-degree gloss meter.

Further, according to a preferred embodiment of the present invention, the print layer comprises a pattern having lower air permeability than the other portions and has, on its whole surface, the protective layer. In this embodiment, the protective layer may contain high-hardness spherical particles for improving abrasion resistance. Further, in this preferred embodiment, concaves and convexes consistent with the pattern having lower air permeability are provided on the surface of the decorative material.

Second Aspect of Invention

According to a second aspect of the present invention, there is provided a decorative material comprising:

- a substrate penetrable with an ionizing radiation-curable resin composition;
- a penetration-inhibiting coating provided on the substrate, for inhibiting the penetration of the ionizing radiation-curable resin composition;
- a cissing pattern provided on the penetration-inhibiting coating, for repelling the ionizing radiation-curable resin composition; and
- a top coat provided on the penetration-inhibiting coating including the cissing pattern, the top coat being formed of an ionizing radiation-cured resin composition, concaves being defined by the top coat, the concaves having been formed as a result of cissing of the ionizing radiation-curable resin composition from on the cissing pattern in the course of the formation of the top coat from the ionizing radiation-curable resin composition.

Preferably, the penetration-inhibiting coating has been formed from a composition composed mainly of an oil-resistant resin. The oil-resistant resin is preferably selected from the group consisting of a polyvinylbutyral resin, a polyvinyl alcohol resin, an acrylic resin, and a mixture of at least one of the resins with a thermosetting resin. Further, preferably, the oil-resistant resin comprises a thermosetting resin and an ionizing radiation-curable prepolymer, oligomer, or monomer.

According to other preferred embodiment of the present invention, the top coat contains spherical particles. In this case, the diameter of the spherical particles is preferably 30 to 200% of the thickness of the top coat.

According to another preferred embodiment of the present invention, the penetration-inhibiting coating functions also as a stress-relaxing layer for relaxing shrinkage stress caused at the time of curing of the ionizing radiation-curable resin for the formation of the ionizing radiation-cured resin constituting the top coat. Particularly preferably, the penetration-inhibiting coating has a yield strength of not less than 0.6 kgf, more preferably 0.6 to 3.0 kgf, and a breaking strength of not less than 1.0 kgf, more preferably 1.0 to 4.0 kgf. The yield strength and the breaking strength are measured in such a manner that two biaxially stretched polyethylene terephthalate film strips having a thickness of 50 $\mu$m and a width of 10 mm are laminated on top of the other through a 3 $\mu$m-thick primer layer so as for the end of one of the strips to overlap with the end of the other strip by 10 mm and, in this state, the two biaxially stretched polyethylene terephthalate film strips are pulled at a temperature of 70° C. in opposite directions.

Further, according to the present invention, concaves consistent with the pattern are provided to impart a feeling of concaves and convexes consistent with the pattern.

Third Aspect of Invention

According to a third aspect of the present invention, there is provided a decorative material comprising:

- a substrate formed of paper;
- a print layer provided on the substrate;
- a sealer layer provided on the print layer; and
- a top coat provided on the sealer layer, the top coat comprising a crosslinked resin,
- the top coat being regulated to a coefficient of dynamic friction of 0.3 to 0.6 in the gloss (75 degrees) range of 10 to 50.

The print layer preferably comprises a colored solid print layer and/or a pattern layer.

The sealer layer preferably contains a matting agent.

Further, the sealer layer preferably functions also as a stress-relaxing layer for relaxing shrinkage stress caused at the time of curing of the ionizing radiation-curable resin for the formation of the ionizing radiation-cured resin constituting the top coat. Particularly preferably, the penetration-inhibiting coating has a yield strength of not less than 0.6 kgf, more preferably 0.6 to 3.0 kgf, and a breaking strength of not less than 1.0 kgf, more preferably 1.0 to 4.0 kgf. The yield strength and the breaking strength are measured in such a manner that two biaxially stretched polyethylene terephthalate film strips having a thickness of 50 $\mu$m and a width of 10 mm are laminated on top of the other through a 3 $\mu$m-thick primer layer so as for the end of one of the strips to overlap with the end of the other strip by 10 mm and, in this state, the two biaxially stretched polyethylene terephthalate film strips are pulled at a temperature of 70° C. in opposite directions.

Fourth Aspect of Invention

According to a fourth aspect of the present invention, there is provided a decorative material comprising:

- a substrate formed of paper;
- a first sealer layer provided on the substrate;
- a print layer provided on the first sealer layer;
- a second sealer layer provided on the print layer;
- a top coat provided on the second sealer layer, the top coat comprising a crosslinked resin,
- the total thickness of the layers being not more than 50 $\mu$m.

According to a preferred embodiment of the present invention, the decorative material has a moisture permeability after 24 hr of not more than 600 g/m$^2$ as measured according to the cup method specified in JIS (Japanese Industrial Standards).

According to a further preferred embodiment of the present invention, the top coat comprises an ionizing radiation-cured resin. According to another preferred embodiment of the present invention, the top coat contains a water-repellent material.

According to another preferred embodiment of the present invention, the top coat contains a hydrophobic silica.

According to still another preferred embodiment of the present invention, the first sealer layer and/or the second sealer layer comprise a crosslinked resin.

According to other preferred embodiment of the present invention, the first sealer layer and/or the second sealer layer function also as a stress-relaxing layer for relaxing shrinkage stress caused at the time of curing of the ionizing radiation-curable resin for the formation of the ionizing radiation-cured resin constituting the top coat. Particularly preferably, the penetration-inhibiting coating has a yield strength of not less than 0.6 kgf, more preferably 0.6 to 3.0 kgf, and a breaking strength of not less than 1.0 kgf, more preferably 1.0 to 4.0 kgf. The yield strength and the breaking strength are measured in such a manner that two biaxially stretched polyethylene terephthalate film strips having a thickness of 50 $\mu$m and a width of 10 mm are laminated on top of the other through a 3 $\mu$m-thick primer layer so as for the end of one of the strips to overlap with the end of the other strip by 10 mm and, in this state, the two biaxially stretched polyethylene terephthalate film strips are pulled at a temperature of 70° C. in opposite directions.

BRIEF DESCRIPTION OF THE DRAWINGS

FIG. 1 and FIGS. 3 to 11 are cross-sectional views of decorative materials according to embodiments of the present invention.

BEST MODE FOR CARRYING OUT THE INVENTION

First Aspect of Invention

Figure 1:
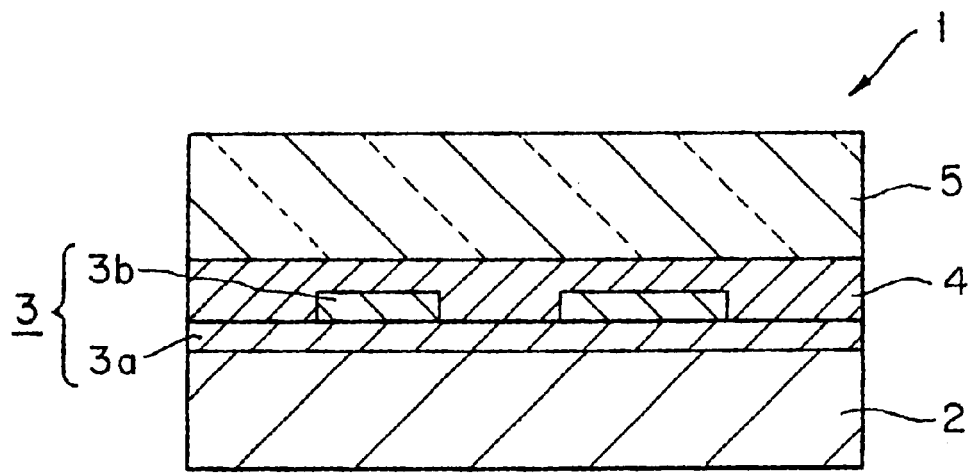

A decorative sheet according to an embodiment of the present invention will be described with reference to the accompanying drawings. A decorative sheet 1 according to the embodiment shown in FIG. 1 comprises a substrate sheet 2, a print layer 3 provided on the surface of the substrate sheet 2, and, on the surface side of the print layer 3, an under coat 4 and an ionizing radiation-cured resin layer 5 as a protective layer.

Materials usable the substrate sheet 2 include papers having a basis weight of about 50 to 150 g/m$^2$, fibrous sheets formed of woven fabrics or nonwoven fabrics, and olefin and vinyl chloride resins. When the substrate sheet 2 is constituted, for example, by a fibrous sheet formed of paper, a woven fabric or a nonwoven fabric, the thickness of the substrate sheet 2 may be about 50 to 300 µm. Fibrous materials usable for constituting the fibrous sheet include organic synthetic or artificial fibers, such as fibers of cellulose pulps, hemp, cotton, and nylon, and inorganic fibers, such as fibers of asbestos, glass, quartz, carbon, and potassium titanate. The fibrous sheet using cellulose pulp fibers is the so-called "paper," and specific examples thereof include wood-free paper, kraft paper, and Japanese paper. Further, for example, the so-called "impregnated paper," which is the fibrous sheet or the like impregnated with a curable resin or the like, may also be used in the base paper for decorative papers.

Another example of the substrate sheet 2 comprises, as a main material, high-density polyethylene or polypropylene as a hard segment and, added thereto, an elastomer as a soft segment and an inorganic filler (first polyolefin resin). An ethylene-propylene-butene copolymer (second polyolefin resin) disclosed in Japanese Patent Laid-Open Nos. 111055/1997, 77371/1993, and 316358/1995 may also be used in the substrate sheet 2. Further, a mixture of isotactic polypropylene as a hard segment with atactic polypropylene as a soft segment (third polyolefin resin) described in Japanese Patent Publication No. 23278/1994 may be used in the substrate sheet 2. If necessary, a colorant may be added thereto.

The high-density polyethylene used in the first polyolefin resin is a high-density polyethylene which is preferably polyethylene having a specific gravity of 0.94 to 0.96 and a polymer, having a high degree of crystallization and no significant branch structure in the molecule, produced by low pressure process. Polypropylene used in the first polyolefin resin is preferably isotactic polypropylene. Elastomers usable in the first polyolefin resin include diene rubber, hydrogenated diene rubber, and olefin elastomer. The hydrogenated diene rubber is a diene rubber wherein a hydrogen atom has been added to at least a part of double bonds of the molecule. The hydrogenated diene rubber functions to inhibit the crystallization of the polyolefin resin to improve the softness. Diene rubbers include isoprene, butadiene, butyl, propylene-butadiene, acrylonitrile-butadiene, acrylonitrile-isoprene, and styrene-butadiene rubbers. The olefin elastomer is an elastomeric copolymer wherein at least one polyene copolymerizable with two or three or more olefins has been added. Olefins usable herein include ethylene, propylene and α-olefins. Polyenes usable herein include 1,4-hexadiene, cyclic diene, and norbornene. Preferred olefin elastomers include, for example, elastomeric olefin-based copolymers, such as ethylene-propylene copolymer rubbers, ethylene-propylene non-conjugated diene rubbers, and ethylene-butadiene copolymer rubbers. These elastomers may, if necessary, be crosslinked to a suitable extent with the aid of a crosslinking agent, such as an organic peroxide or sulfur.

The amount of the elastomer added is generally 10 to 60% by weight, preferably about 30% by weight. When the amount of the elastomer added is less than 10% by weight, the change in elongation under a given load is excessively rapid and, in addition, the breaking elongation, the impact strength, and the easy adhesion are deteriorated. On the other hand, the amount of the elastomer added is more than 60% by weight, the transparency, the weathering resistance, and the creep resistance are deteriorated.

Inorganic fillers usable herein include powders having an average particle diameter of about 0.1 to 10 µm, such as calcium carbonate, barium sulfate, clay, and talc. The amount of the inorganic filler added is generally about 1 to 60% by weight, preferably 5 to 30% by weight. When the amount of the inorganic filler added is less than 1% by weight, the creep deformation resistance and the easy adhesion are deteriorated. On the other hand, when the amount of the inorganic filler added exceeds 60% by weight, the breaking elongation and the impact resistance are lowered.

The second polyolefin resin is a thermoplastic elastomer comprising an ethylene-propylene-butene copolymer resin. All three structural isomers of 1-butene, 2-butene, and isobutylene are usable as the butene. The copolymer is a random copolymer and partly contains an amorphous portion.

Specific examples of preferred ethylene-propylene-butene copolymer resins include the following three ethylene-propylene-butene copolymer resins. The first copolymer resin is a random copolymer of a terpolymer of ethylene, propylene, and butene described in Japanese Patent Laid-Open No. 111055/1997. Not less than 90% by weight of the copolymer is accounted for by propylene. The melt flow rate of the copolymer is suitably 1 to 50 g/10 min under conditions of 230° C. and 2.16 kg. 0.01 to 50 parts by weight of a transparent nucleator composed mainly of an aryl phosphate compound and 0.003 to 0.3 part by weight of an fatty acid amide having 12 to 22 carbon atoms has been melt kneaded with 100 parts by weight of the terpolymer to prepare the random copolymer.

The second copolymer is a terpolymer of ethylene, propylene, and butene described in Japanese Patent Laid-Open No. 77371/1993 wherein 80 to 0% by weight of crystalline polypropylene has been added to 20 to 100% by weight of an amorphous magnetic material having a propylene component content of not less than 50% by weight. The third copolymer is a terpolymer of ethylene, propylene, and 1-butene described in Japanese Patent Laid-Open No. 316358/1995 wherein 0.5% by weight of an oil gelling agent, such as N-acylamino acid amine salt or an N-acylamino acid ester, has been added to a composition comprising 20 to 100% by weight of a low crystalline polymer having a propylene and/or 1-butene content of not less than 50% by weight and, added thereto, 80 to 0% by weight of a crystalline polyolefin, such as isotactic polypropylene.

The ethylene-propylene-butene copolymer resin may be used alone or as a mixture of the ethylene-propylene-butene copolymer resin optionally with other polyolefin resin.

The third polyolefin resin is a soft polypropylene described in Japanese Patent Laid-Open No. 23278/1994 which comprises a mixture of 10 to 90% by weight of a soft segment of an atactic polyolefin, having a number average molecular weight Mn of not less than 25,000 with a ratio of weight average molecular weight Mw to number average molecular weight Mn, that is, Mw/Mn, ≦7 and soluble in boiling heptane, with 90 to 10% by weight of a hard segment of isotactic polypropylene which has a melt index of 0.1 to 4 g/10 and is insoluble in boiling heptane.

Among the soft polypropylenes, those, which are less likely to cause the so-called "necking" and have good suitability for embossing for forming into various shapes under heat and pressure conditions, comprise a mixture of isotactic polypropylene with atactic polypropylene and preferably have an atactic polypropylene component content of 5 to 50% by weight, more preferably 20 to 40% by weight.

In an atactic polypropylene content of less than 5% by weight, nonuniform sheet deformation by necking at the time of embossing or forming into products having three-dimensional shapes or concaves and convexes and consequently cockles and deformation of the printed pattern are likely to occur. When the content of the atactic polypropylene exceeds 50% by weight, the sheet per se is likely to be deformed. This causes the sheet to be deformed when the sheet is passed through a printing machine, leading to problems, for example, deformation of the printed pattern and, in the case of multi-color printing, misregistration.

If desired, colorants, ultraviolet absorbers, photostabilizers, heat stabilizers, antioxidants, antistatic agents, flame retardants, foaming agent and the like may be added to the olefin resin in the substrate sheet 2. Colorants usable herein include: inorganic pigments, such as titanium white, zinc flower, iron oxide red, vermillion, ultramarine blue, cobalt blue, titanium yellow, chrome yellow, and carbon black; organic pigments or dyes, such as isoindolinone, Hanza Yellow A, quinacridone, Permanent Red 4R, and phthalocyanine blue; metal pigments, such as flake powders of aluminum, brass and the like; and nacreous pigments, such as flake powders of titanium dioxide covered mica and basic zinc carbonate. Any of transparent coloration and opaque (masking) coloration may be used. In general, opaque coloration is preferred from the viewpoint of concealing the adherend.

Heat stabilizers include conventional phenolic, sulfite, phenylalkane, phosphite, amine and other heat stabilizers. These heat stabilizers are used in improving the prevention of deterioration, such as heat discoloration, at the time of thermal processing. Flame retardants include powders of aluminum hydroxide, magnesium hydroxide and the like. These are added when flame retardancy is added.

The ultraviolet absorber is used to impart better weathering resistance to the resin, and examples thereof include: benzophenone ultraviolet absorbers, such as 2-hydroxybenzophenone; and salicylic ester ultraviolet absorbers, such as phenyl salicylate and 4-t-butyl-phenyl salicylate. In addition, reactive ultraviolet absorbers with an acryloyl or methacryloyl group introduced into the benzotriazole skeleton may also be used. The amount of the ultraviolet absorber added is generally about 0.1 to 10% by weight.

The addition of a radical scavenger is preferred from the viewpoint of further preventing deterioration by ultraviolet light and improving the weathering resistance. Radical scavengers include bis-(2,2,6,6-tetramethyl-4-piperazinyl) sebacate, bis-(N-methyl-2,2,6,6-tetramethyl-4-piperidinyl) sebacate, and, in addition, hindered radical scavengers and piperidinyl radical scavengers disclosed, for example, in Japanese Patent Publication No. 82625/1992.

The substrate sheet may be produced by blending the above materials and forming the blend into a film by a conventional method, such as calendering. The thickness of the substrate sheet is generally about 50 to 200 μm, preferably about 100 ∞m.

The print layer 3 is formed by pattern printing, color printing or the like. The print layer 3 is specifically a colored (transparent or opaque) pattern or solid print with a pigment added thereto, and may be formed using an ink (or a coating composition), for example, by a conventional printing method, such as gravure printing, offset printing, silk screen printing, or transfer printing from a transfer sheet. Patterns in the print layer 3 include woodgrain patterns, rift patterns, texture patterns, leather grain patterns, geometric figures, letters, and symbols. In inks used in the print layer 3, for example, chlorinated polyolefins, such as chlorinated polyethylene and chlorinated polypropylene, polyesters, polyurethane, acryl, vinyl acetate, vinyl chloride-vinyl acetate copolymer, and cellulose resins may be used as a binder. They may be used alone or as a mixture of two or more. Pigments and the like may be added to the binder. The print layer 3 may be provided on the whole surface or a part of the surface of the substrate sheet 2. As shown in FIG. 1, the print layer 3 may comprise a solid print layer 3a provided on the whole surface of the substrate sheet 2 and a pattern print layer 3b partially provided on the surface of the solid print layer.

When the substrate sheet 2 is formed of paper, the use of an acryl nitrocellulosic ink is preferred. On the other hand, when the substrate sheet 2 is formed of an olefin resin, the use of a urethane ink is preferred. When the substrate sheet 2 is formed of a vinyl chloride resin, the use of a vinyl chloride-vinyl acetate copolymer ink is preferred. Any ink capable of forming a desired pattern may be used so far as the adhesion to the substrate sheet 2 is good.

The acryl nitrocellulosic ink is a mixture of an acrylic resin and nitrocellulose in any mixing ratio. In this case, the ratio of the acrylic resin to nitrocellulose may be any one. Acrylic resins include acrylic resins (the term "(meth)acryl" used herein referring to acryl or methacryl; the same shall apply hereinafter) which are homopolymers or copolymers containing an (meth)acrylic ester, such as polybutyl (meth)acrylate, polyethyl (meth)acrylate, polypropyl (meth)acrylate, polybutyl (meth)acrylate, methyl (meth)acrylate-butyl (meth)acrylate copolymer, ethyl (meth)acrylate-butyl (meth)acrylate copolymer, ethylene-methyl (meth)acrylate copolymer, and styrene-methyl (meth)acrylate copolymer.

At least one acrylic resin selected from the above acrylic resins is mixed with nitrocellulose, and the mixture is used for the ink layer.

An under coat or primer layer 4 is provided for relaxing shrinkage at the time of curing of an ionizing radiation-curable resin layer for the formation of the ionizing radiation-cured resin layer 5. The under coat 4 may be formed of acrylic resin, vinyl chloride-vinyl acetate copolymer, polyester resin, urethane resin, butyral resin, chlorinated polypropylene, or chlorinated polyethylene.

When the under coat 4 is formed of a resin layer composed mainly of an acrylic resin, acrylic resins usable herein include those used in the acryl nitrocellulosic ink, for example, acrylic resins (the term "(meth)acryl" used herein referring to acryl or methacryl; the same shall apply hereinafter) which are homopolymers or copolymers containing an (meth)acrylic ester, such as polymethyl (meth)acrylate, polyethyl (meth)acrylate, polypropyl (meth)acrylate, polybutyl (meth)acrylate, methyl (meth)acrylate-butyl (meth)acrylate copolymer, ethyl (meth)acrylate-butyl (meth)acrylate copolymer, ethylene-methyl (meth)acrylate copolymer, and styrene-methyl (meth)acrylate copolymer.

A urethane resin may also be used for forming the under coat 4. The urethane resin may be a polyurethane comprising a polyol (a polyhydric alcohol) as a main agent and an isocyanate as a crosslinking agent (a curing agent). Polyols usable herein include those having two or more hydroxyl groups in the molecule thereof, for example, polyethylene glycol, polypropylene glycol, acrylpolyol, polyester polyol, and polyether polyol. Isocyanates usable herein include those having two or more isocyanate groups in the molecule thereof, for example, polyisocyanate, aromatic isocyanate, such as 4,4-diphenylmethane diisocyanate, or aliphatic (or alicyclic) isocyanate, such as hexamethylene diisocyanate, isophorone diisocyanate, hydrogenated tolylene diisocyanate, and hydrogenated diphenylmethane diisocyanate. Further, the under coat 4 may be formed of a mixture of a urethane resin with a buryral resin.

The under coat 4 is a layer for relaxing shrinkage at the time of curing of an ionizing radiation-curable resin layer for the formation of an ionizing radiation-cured resin layer 5. In order to attain the contemplated effect, the thickness of the under coat 4 is set to 1 to 5 μm. In particular, a thickness of not less than 2 μm is preferred from the viewpoint of relaxing the shrinkage of the curable resin layer, and a thickness of not more than 3 μm is preferred from the viewpoint of preventing layer-to-layer separation. Therefore, the layer thickness is more preferably about 2 to 3 μm. When the under coat 4 having a thickness selected from the above thickness range is formed on the pattern layer 3 and, thereafter, an ionizing radiation-curable resin layer is formed thereon followed by curing the ionizing radiation-curable resin layer to form an ionizing radiation-cured resin layer 5 as the protective layer, the influence of condensation of the ionizing radiation-curable resin layer does not directly reach the print layer 3. The softness of the under coat 4 per se can satisfactorily relax the shrinkage at the time of curing of the ionizing radiation-curable resin layer to form the ionizing radiation-cured resin layer 5.

The under coat 4 may be formed by a direct coating method. A transfer coating method may also be used. When the under coat 4 is formed by the direct coating method, gravure coating, gravure reverse coating, gravure offset coating, spinner coating, roll coating, reverse roll coating, kiss coating, whirler coating, dip coating, solid coating using silk screen, wire bar coating, flow coating, Komma coating, cast coating, brush coating, or spray coating or the like may be used. The transfer coating method is such that a coating for an under coat is once formed on a thin sheet or film (substrate) and then covered on the surface of the substrate. Examples of the transfer coating method include a lamination method wherein the coating of the coating composition, together with the substrate, is adhered onto a three-dimensional object, and a transfer method wherein a transfer sheet comprising a releasable support sheet and, provided thereon, a coating and optionally an adhesive layer is once adhered and only the support sheet is separated.

The ionizing radiation-curable resin layer 5 for the formation of the ionizing radiation-cured resin layer as the protective layer may be an ionizing radiation-curable composition comprising a suitable mixture of prepolymers, oligomers and/or monomers having a polymerizable unsaturated bond(s) or an epoxy group(s) in the molecule thereof. The term "ionizing radiation" used herein refers to electromagnetic radiations or charged particle beams which have energy quanta capable of polymerizing or crosslinking molecules, and generally refers to, for example, ultraviolet light or electron beam. In the present embodiment, the ionizing radiation-curable resin is an electron beam-curable resin which, upon exposure to an electron beam, can be cured to form an electron beam-cured resin having high hardness.

Prepolymers and oligomers include: unsaturated polyesters, such as condensates of unsaturated dicarboxylic acids with polyhydric alcohols; methacrylates, such as polyester methacrylates, polyether methacrylates, polyol methacrylates, and melamine methacrylates; acrylates, such as polyester acrylates, epoxy acrylates, urethane acrylates, polyether acrylates, polyol acrylates, and melamine acrylates; and cationically polymerizable epoxy compounds.

Urethane acrylates include, for example, polyether urethane (meth)acrylates represented by the following general formula which are prepared, for example, by reacting polyether diol with diisocyanate:

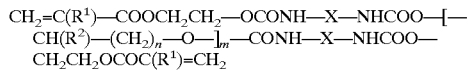

wherein
R$^1$ and R$^2$ each independently represent a hydrogen atom or a methyl group; X represents a diisocyanate residue; n is an integer of 1 to 3; and m is an integer of 6 to 60.

Diisocyanates usable as the polyether urethane (meth) acrylate include, for example, isophorone diisocyanate, dicyclohexylmethane diisocyanate, hexamethylene diisocyanate, diphenylmethane diisocyanate, and tolylene diisocyanate. Polyether diols include polyoxypropylene glycol, polyoxyethylene glycol, and polyoxytetramethylene glycol, these polyether diols having a molecular weight of 500 to 3,000.

Examples of the production of urethane acrylate will be described. A glass reactor equipped with a dropping funnel, a thermometer, a ref lux condenser, and a stirring rod was charged with 1,000 parts of polytetramethylene glycol having a molecular weight of 1,000 and 444 parts of isophorone diisocyanate. The system was allowed to react at 120° C. for 3 hr, and then cooled to 80° C. or below. 232 parts by weight of 2-hydroxyethyl acrylate was added thereto, and a reaction was allowed to proceed at 80° C. until the isocyanate group disappeared. Thus, a urethane acrylate was prepared.

Monomers usable for the formation of the ionizing radiation-curable resin include styrene monomers, such as styrene and α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated substituted acids, such as 2-(N,N-diethylamino)ethyl acrylate, 2-(N,N-dimethylamino)ethyl methacrylate, 2-(N,N-dibenzylamino) methyl acrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, and triethylene glycol diacrylate, polyfunctional compounds, such as dipropylene glycol diacrylate, ethylene glycol diacrylate, propylene glycol dimethacrylate, and diethylene glycol dimethacrylate, and/or polythiol compounds having two or more thiol groups in a branch thereof, for example, trimethylolpropane trithioglycolate, trimethylolpropane trithiopropylate, and pentaerythritol tetrathioglycol.

A photopolymerization initiator may be added to the ionizing radiation-curable resin layer for the formation of the ionizing radiation-cured resin layer 5. Photopolymerization initiators include acetophenones, benzophenones, Michler's benzoyl benzoate, α-aminoxime ester, tetramethylthiuram monosulfide, thioxanthones, aromatic diazonium salt, aromatic sulfonium salt, and metallocene. n-Butylamine, triethylamine, tri-n-butylphosphine or the like may be further added as a photopolymerization accelrator (a sensitizer). The amount of the photopolymerization initiator added is preferably 1 to 10% by weight from the viewpoint of good curability. The photopolymerization initiator is preferably a benzophenone photopolymerization initiator from the viewpoint of good curability.

The ionizing radiation-cured resin layer 5 may further contain, dispersed therein, spherical particles for further imparting scratch resistance to the ionizing radiation-cured resin layer 5. The spherical particles may be made of any material so far as the hardness is higher than the resin cured by crosslinking. Inorganic particles or organic resin particles may be used as the spherical particles. However, inorganic particles are recommended from the viewpoint of abrasion resistance and hardness. The difference in hardness between the spherical particles and the resin cured by crosslinking may be measured, for example, by the Mohs hardness, Vickers hardness or other method, and is preferably not less than 1 in terms of Mohs hardness.

Specific examples of materials for spherical particles include inorganic particles of α-alumina, silica, chromium oxide, iron oxide, diamond, graphite and the like, and organic resin particles, such as beads of synthetic resins, such as crosslinked acrylic resins. Particularly preferred spherical particles are spherical α-alumina, for example, from the viewpoint of very high hardness, high effect of abrasion resistance, and relatively good availability of spheres.

The spherical particles may be in any shape so far as the surface is surrounded by a smooth curve, and examples of shapes include truly spherical shapes, ellipsoids of revolution in a flattened sphere form, shapes close to true spheres, and shapes close to ellipsoids of revolution. Preferably, the spherical particles are free from protrusions, corners, valleys, or concaves particularly on the surface of particles. The spherical particles, as compared with particles, having irregular shapes, of the same material, can advantageously significantly improve the abrasion resistance of the surface resin layer per se, does not abrade a coating device, and, even after the curing of the coating, does not abrade other materials, which come into contact with the coating, and, in addition, can provide higher transparency of the coating. Spherical particles having smooth shapes can improve the effect.

In the present embodiment, particularly the resin constituting the ionizing radiation-cured resin layer 5 preferably has an average molecular weight between crosslinks of not less than 100 and not more than 200. When the average molecular weight between crosslinks falls within this range, in a test on resistance to staining, any contaminant is not left on the surface of the layer, and the surface of the layer exhibits good resistance to staining. According to the present embodiment, in curing the ionizing radiation-curable resin layer to form the ionizing radiation-curable resin layer to form the ionizing radiation-cured resin layer 5, the under coat 4 relaxes shrinkage caused in the course of curing of the resin layer. This can prevent the surface of the print layer 3 from being directly broken. Primarily, when the average molecular weight between crosslinks is not more than 200, the crosslinking reaction strongly acts in the layer, leading to significant shrinkage. However, the under coat 4 functions to scatter the force created by shrinkage and thus can prevent the print layer 3 from being broken. The average molecular weight between crosslinks of the resin constituting the ionizing radiation-cured resin layer 5 may be determined by dividing the molecular weight of the whole resin by the number of crosslink points (see the numerical formula described above). In this case, the molecular weight of the whole resin is Σ (number of moles of each component incorporated x molecular weight of each component), and the number of crosslink points is Σ[1(number of functional groups in each component −1) x 21 x number of moles of each component].

The ionizing radiation-cured resin layer 5 may contain an ionizing radiation-noncurable resin so far as the resistance to staining is not sacrificed. Ionizing radiation-noncurable resins usable herein include thermoplastic resins, such as urethane, cellulosic, polyester, acrylic, butyral, polyvinyl chloride, polyvinyl acetate and other thermoplastic resins. Among them, cellulosic, urethane, and butyral thermoplastic resins are preferred from the viewpoint of flexibility. The ionizing radiation-cured resin layer 5 may be formed by coating a coating composition containing the above-described ionizing radiation-curable resin, spherical alumina, and plastic beads and other additives on the print layer 3 provided on the substrate sheet 2 and curing the coating. The coating composition for the ionizing radiation-cured resin layer 5 may contain, in addition to the above ingredients, colorants, such as dyes or pigments, and, in addition, additives commonly added to coating compositions or inks, for example, fillers including conventional matte regulating agents or extenders, such as $CaCO_2$ and $BaSO_4$, antifoaming agents, levelling agents, thixotropic agents so far as the transparency, abrasion resistance and the like as the surface resin layer are not sacrificed.

In order to modify the viscosity, the coating composition for the ionizing radiation-cured resin layer 5 may contain not more than 30% by weight, based on the composition, of a solvent which can dissolve components of the resin and has a boiling point of 70 to 150° C. at the atmospheric pressure. When the amount of the solvent added is not more than 30% by weight, the coating can be smoothly dried and the production speed is not significantly lowered.

The solvent may be any solvent commonly used, for example, in coating compositions and inks, and specific examples thereof include: aromatic hydrocarbons, such as toluene and xylene; ketones, such as acetone, methyl ethyl ketone, methyl isobutyl ketone, and cyclohexanone; acetic esters, such as ethyl acetate, isopropyl acetate, and amyl acetate; alcohols, such as methyl alcohol, ethyl alcohol, and isopropyl alcohol; ethers, such as dioxane, tetrahydrofuran, and diisopropyl ether; and a mixture of two or more of these solvents.

The ionizing radiation-cured resin layer may be formed by a direct coating method wherein the coating composition is coated directly on the surface of the substrate sheet, or by a transfer coating method wherein an ionizing radiation-curable resin layer is previously formed on the surface of a releasable substrate followed by transfer of the ionizing radiation-curable resin layer onto the surface of the substrate sheet. When a decorative paper is used as the substrate sheet, any of the direct coating method and the transfer coating method may be used if a base paper for the decorative paper is formed of a material into which the coating composition cannot penetrate. On the other hand, the use of the transfer coating method is preferred when the base paper for the decorative paper is penetrable with the coating composition, when the substrate has surface irregularities, when an even coating thickness is contemplated, or when the provision of uniform abrasion resistance is contemplated by using uniform intensity of the ionizing radiation.

Direct coating methods usable herein include gravure coating, gravure reverse coating, gravure offset coating, spinner coating, roll coating, reverse roll coating, kiss coating, whirler coating, dip coating, solid coating using silk screen, wire bar coating, flow coating, spray coating or the like. Among them, gravure coating is preferred.

The transfer coating method may utilize the following means (a) to (d). Specifically, for example, use may be made of a lamination method (a, b) wherein a coating is once formed on a thin sheet (film) substrate and then cured by crosslinking followed by covering on the surface of a substrate or wherein a coating of a coating composition, together with a substrate, is adhered to a three-dimensional object, and a transfer method (c) wherein a transfer sheet formed by once forming a coating and optionally an adhesive layer on a releasable support sheet and curing the coating by crosslinking is adhered to a three-dimensional object, in such a manner that the coating side faces the three-dimensional object, followed by removal of only the support sheet. Specifically, examples of means usable herein include (a) a simultaneous injection molding and transfer method as disclosed in Japanese Patent Publication Nos. 42080/1990 and 19924/1992, or a simultaneous injection molding and lamination method as disclosed in Japanese Patent Publication No. 19132/1975, (b) a simultaneous vacuum forming and transfer method as disclosed in Japanese Patent Laid-Open Nos. 288214/1992 and 57786/1993, or a simultaneous vacuum forming and lamination method as disclosed in Japanese Patent Publication No. 45768/1981, (c) a simultaneous lapping and transfer method or a simultaneous lapping and lamination method as disclosed, for example, in Japanese Patent Publication Nos. 51900/1984, 5895/1986, and 2666/1991, and (d) a simultaneous V-cutting and lamination method as disclosed, for example, in Japanese Utility Model No. 31122/1926, or a simultaneous V-cutting and transfer method as disclosed in Japanese Patent publication No. 7866/1981. The resin layer may be formed on the thin sheet substrate by various coating means as used in the direct coating method.

Further, a method may be used wherein the following steps (A) to (D) may be carried out sequentially (as described in Japanese Patent Laid-Open No. 26673/1990). Specifically, this method comprises the steps of: (A) coating an uncured, liquid ionizing radiation-curable resin composition onto a nonabsorptive, releasable synthetic resin sheet; (B) laminating the coated sheet onto a substrate in such a manner that the coating comes into contact with the substrate; (C) applying an ionizing radiation to the coating of the ionizing radiation-curable resin composition to cause crosslinking and curing the coating; and (D) separating and removing the synthetic resin sheet. In the method, when the ionizing radiation-curable resin is used after dilution with a solvent, the step of removing the solvent is provided between the step (A) and the step (B). According to the above method, even when the substrate is a material having high penetrability, such as paper, the so-called "strike through," wherein the resin passes through the substrate and reaches the opposite side of the substrate, can be surely prevented. This enables an ionizing radiation-cured resin layer 5 having good abrasion resistance to be easily formed on the surface of the substrate.

Figure 2:
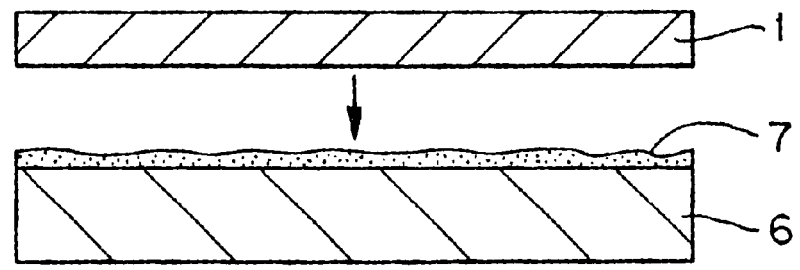
FIG. 2 is a cross-sectional view showing a production process of the decorative material according to the present invention.
Figure 3:
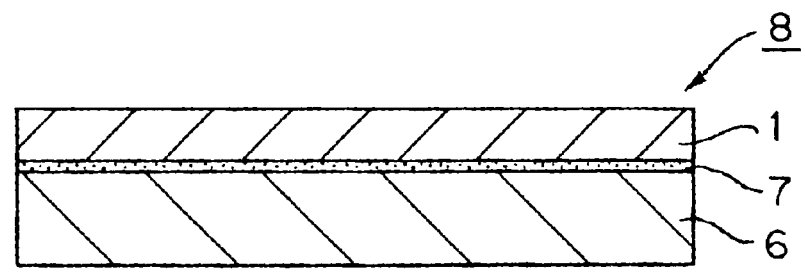

As shown in FIG. 2, the decorative plate according to the present invention comprises: a substrate 6 for a decorative plate; and a decorative sheet 1 applied onto the substrate 6 for the decorative plate, the decorative sheet 1 comprising the substrate sheet, the print layer, the under coat, and the ionizing radiation-cured resin layer stacked in that order on top of one another. As shown in FIG. 2, in bonding the decorative sheet 1, an adhesive 7 is coated onto the surface of the substrate 6 for the decorative plate, and the decorative sheet 1 is then laminated onto the substrate 6 for the decorative plate in such a manner that the decorative sheet 1 comes into contact with the adhesive 7, followed by integration to prepare a decorative plate 8 as shown in FIG. 3. The adhesive 7 may be coated on the side of the decorative sheet 1.

Substrates 6 for the decorative plate usable herein include: wood plates, such as veneers of wood, plywoods, particle boards, and MDFs (medium-density fiber boards); gypsum boards and gypsum-based boards, such as gypsum slag boards; cement boards, such as calcium silicate boards, asbestos slate boards, lightweight gas concrete boards, and hollow extrusion cement boards; fiber cement boards, such as pulp cement boards, asbestos cement boards, and wood chip cement boards; ceramic boards, such as earthenwares, porcelains, stonewares, doki, glass, and porcelain enamels; metallic plates, such as iron plates, galvanized steel plates, polyvinyl chloride sol-coated steel plates, aluminum plates, and copper plates; thermoplastic resin plates, such as polyolefin resin plates, acrylic resin plates, ABS plates, and polycarbonate plates; thermosetting resin plates, such as phenolic resin plates, urea resin plates, unsaturated polyester resin plates, polyurethane resin plates, epoxy resin plates, and melamine resin plates; and resin plates, such as the so-called FRP plate, produced by impregnating resins, such as phenolic resins, urea resins, unsaturated polyester resins, polyurethane resins, epoxy resins, melamine resins, or diallyl phthalate resins into glass fiber nonwoven fabrics, woven fabrics, papers, or other various fibrous substrates, and curing the impregnated substrates to prepare composites. The substrate for the decorative plate may be a composite substrate produced by stacking two or more of the above various substrates on top of each other or one another by conventional means, for example, with the aid of an adhesive or by hot fusing.

The adhesive may be any one so far as it can bond the substrate 6 for the decorative plate to the decorative sheet 1, and examples thereof include vinyl acetate and urea adhesives.

Lamination of a decorative sheet onto a substrate, such as a particle board, for imparting surface decoration to the substrate to prepare a decorative material is well known in the art. Decorative sheets usable in the decorative material include precoated papers, for example, urethane coated papers prepared by coating a base paper with a urethane resin and an EB coated paper prepared by coating a base paper with an ionizing radiation-curable resin. In these decorative sheets, high temperature treatment is carried out at the time of lamination of the decorative sheet onto the substrate. This poses a problem that the resin layer in the decorative sheet is deteriorated due to a heat change between before and after hot lamination. This causes a change in gloss of the decorative sheet in its surface and in its turn adversely affects the decorative effect.

The decorative sheet of the present invention for solving the above problem is a decorative sheet to be hot laminated onto a substrate, the decorative sheet preferably having, as the outermost layer, a surface protective layer having a maximum temperature, at which the surface protective layer can withstand, of 170° C. The "maximum temperature at which the surface protective layer can withstand" refers to the maximum temperature at which the gloss of the surface protective layer is not changed.

The gloss of the surface protective layer in the decorative sheet is preferably not less than 90 as measured with a Gardner 75-degree gloss meter. In this case, the surface protective layer is preferably formed of an electron beam-cured resin which has been produced from a composition preferably selected from those containing an urethane acrylate oligomer, a polyester acrylate oligomer, a polyfunctional monomer, and a monofunctional monomer.

The decorative material according to the present invention include a decorative material of the above decorative sheet hot laminated onto the substrate.

The layer construction of the decorative sheet according to this embodiment is shown in FIG. 9. Numeral 93 designates a base paper 93 serving as a substrate sheet in the decorative sheet. A pattern layer 92 is formed using a printing ink on the base paper 93, and a surface protective layer 91 formed of an electron beam-cured resin is further provided on the pattern layer 42. The layer construction of the decorative material according to the present invention is shown in FIG. 10. As shown in FIG. 10, the decorative sheet according to the present invention is hot laminated onto various substrates 94, such as particle boards, to prepare a decorative material according to the present invention. Conventional decorative sheets undergo a thermal deterioration at 150 to 170° C. As a result, the surface gloss of the decorative sheet is lowered. By contrast, since the decorative sheet according to the present invention has a maximum temperature, at which the decorative sheet can withstand, of 170° C., the decorative sheet, even when exposed to a temperature up to 170° C., does not undergo a deterioration in gloss.

Preferably, the resin used in the surface protective layer has a maximum temperature, at which the resin can withstand, of 170° C. Resins having such heat resistance include phenolic resins, melamine resins, silicone resins, urea resins, and electron beam-cured resins. Electron beam-curable resins for the electron beam-cured resin include those containing a urethane acrylate oligomer, a polyester acrylate oligomer, a polyfunctional monomer, and a monofunctional monomer.

A pattern is formed using a printing ink on a base paper by a conventional printing technique, such as gravure printing, offset printing, or silk screen printing.

Base papers usable herein include tissue papers, wood-free papers, and Japanese papers. In particular, a paper called "titanium paper," into which an opaque pigment, such as titanium oxide, has been mixed, is preferred because of its excellent opacifying power and impregnation of the resin liquid.

The substrate is preferably one which can provide thickness and strength necessary as the decorative material, and examples thereof include plywoods and particle boards.

Embodiments of the decorative material having concaves and convexes consistent with the printed pattern formed in the print layer will be described.

Various attempts to render recesses in the vessel portions of the woodgrains have hitherto been made. For example, Japanese Patent Laid-Open No. 20912/1973 discloses a method for rendering a feeling of concaves and convexes wherein flat dull vessels are printed and, thereafter, a glossy print is then provided on portions other than the vessels. Japanese Patent Laid-Open No. 16752/1974 discloses a method wherein three or more inks with the content of the particulate solid being step-wise increased are printed and, in this case, particularly the vessel portion is printed using an ink or coating composition having the highest particulate solid content, followed by the provision of a surface protective layer on the whole surface. Further, Japanese Patent Laid-Open No. 108539/1990 discloses a method wherein upper portions of the vessel pattern and upper portions of the other patterns are printed respectively using matte and glazing inks to render a feeling of concaves and convexes.

In the case of printing of ordinary woodgrain patterns, gravure printing is generally used, and plates of three-color separation are also used. Rather, however, special printing using special plates, that is, special printing using three plate cylinder rollers in total, that is, a plate cylinder roller for uniformly applying a color, i.e., for solid printing, a plate cylinder roller for rendering the shading of the whole woodgrain, and a plate cylinder roller for rendering vessel portions, is carried out in more cases. Since elastic special original materials are in many cases used, the above special printing is used. In this case, special plates are used wherein, in the registration, slight deviation in the flow of the original material, that is, in the direction of the length, does not provide an impression of significant drawback. In this special printing, instead of conventional yellow, magenta, cyan, and black process colors as inks, specially blended special color inks are generally used.

An attempt to render recesses of the vessel portion by using an ink different from that used in the formation of the vessel portion requires an additional plate cylinder roller in addition to the above three plate cylinder rollers. Further, an attempt to render the raised portion in the pattern other than the vessel portion requires a further additional plate cylinder roller. When one or two plate cylinder rollers are used in addition to the conventional three plate cylinder rollers, a three-color machine cannot be used because only up to three plate cylinders can be installed. Instead, for registration between patterns, a four-color machine, a five-color machine, or a multi-color machine for more colors should be used. This leads to a limitation of usable printing machines. The surface protective layer may be formed by a printing machine. However, the use of a coater, such as a roll coater, is more suited. If possible, the use of a coater different from the printing machine is preferred. When uniform coating is carried out on the whole surface after printing, registration between the print pattern and the coating layer is unnecessary. Therefore, it is possible to use a method wherein an original material, which has been once wound after the completion of the print, is fed from a paper feed stand of a coater and coating may be carried out without taking into consideration particularly the registration. When coating is carried out after printing and printing is then carried out once more, registration between print patterns is necessary. In this case, the original material, which has been once wound after the completion of the printing and coating, is fed again from a paper feed stand of the printing machine followed by printing. In fact, however, registration between the printed pattern and the pattern to be later printed is very difficult.

When the conventional techniques described is reviewed based on the above general finding, it is apparent that the conventional techniques have the following drawbacks. In the first conventional technique, in addition to printing of ordinary woodgrain patterns, printing is carried out using two plate cylinder rollers, and, in this printing, exact registration is necessary between a positive plate having a pattern corresponding to portions of vessels and a plate having a pattern in a negative relationship with the above pattern. That is, exact registration is required so as not to create a space between both printed patterns. When a space is created between both the printed patterns, physical and chemical various properties of the surface cannot be ensured in that portion. In the second conventional technique, since the surface protective layer is provided, the physical and chemical various properties of the surface are ensured to some extent. In this technique, however, three or more inks with the particulate solid content being step-wise increased should be necessarily used for the formation of portions including those other than the vessel portion. This is causative of the limitation of rendering of texture. Further, the addition of the particulate solid accelerates the penetration of the coating composition coated on the vessel portion. This increases the amount of a waste coating composition for improving the surface properties, and considerable penetration of the coating composition occur also in portions other than the vessel portion although the degree of the penetration varies from portion to portion depending upon the particulate solid content. In the third conventional technique, consideration is made so that the registration accuracy is relaxed. As with the first conventional technique, however, a pattern different from the woodgrain pattern should be formed in order to provide a feeling of concaves and convexes. Therefore, in addition to a plate cylinder roller for rendering a conventional pattern, two additional plate cylinder rollers should be provided.

Therefore, according to a preferred embodiment of the present invention, there is provided a decorative material, having a feeling of concaves and convexes consistent with a pattern, which, in the production thereof, can eliminate the drawbacks of the prior art, that is, can minimize the necessity of increasing the number of plate cylinders and is less likely to cause a problem of registration, and, in addition, has a uniform surface protective layer having satisfactory protective function.

According to another preferred embodiment of the present invention, there are provided a decorative material which has improved physical and chemical various properties of the surface while enjoying the feeling of concaves and convexes consistent with the pattern, and a decorative material provided with a protective layer having improved abrasion resistance.

That is, according to a preferred embodiment of the present invention, the print layer is formed of a pattern having lower air permeability than the other portions, and a protective layer is provided on the whole surface of the print layer.

One example of the decorative material according to the above embodiment is shown in FIG. 11. A woodgrain pattern 103 including a vessel pattern 102 and a pattern 104, with higher air permeability, covering portions other than the portions on the vessel pattern 102 are provided through a primer layer 106 on a substrate 101. A surface protective layer 105 is provided on the whole surface covering the vessel pattern 102 and the pattern 104. As shown in the drawing, the woodgrain pattern 103 includes a solid print.

In this embodiment, attention is drawn to a woodgrain pattern, and portions corresponding to the woodgrain vessel pattern are rendered more matte as compared with portions around the portions corresponding to the woodgrain vessel pattern in order to provide an appearance such that the vessel pattern is in a recessed state. At the outset, a woodgrain pattern 103 containing a vessel pattern 102 corresponding to woodgrain vessels and a pattern 104, with higher air permeability, covering portions other then portions on the vessel pattern 102 are provided on a substrate 101. The vessel pattern 102 and other woodgrain pattern are formed using conventional inks, and, as described below, the pattern 104 is formed so that the air permeability is lower than that in the other portions. The woodgrain pattern is an embodiment in which the effect of the present invention can be easily attained. As described above in connection with the prior art, however, the present invention can be applied to any pattern so far as the feeling of concaves and convexes is rendered by gloss.

The substrate 101 may be any substrate commonly used in the decorative material. Substrates usable herein may be classified roughly into various papers, plastic films or plastic sheets, metallic foils, metallic sheets or metallic plates, wood-based plates, such as wood, and various ceramic materials. Materials falling within these groups may be used alone or alternatively as a laminate of any combination of these materials, such as a composite between papers, a composite of a paper and a plastic film or the like. These substrates may be painted for regulating colors, or alternatively, a conventional pattern may be previously formed from the viewpoint of design. Prior to the coating or the formation of conventional patterns, the surface may be smoothed, or alternatively may be subjected to substrate treatment for enhancing the adhesion of the pattern. Further, after the coating or the formation of conventional patterns, adhesion-improving treatment may be carried out for facilitating subsequent processing.

Typical papers include tissue papers, kraft papers, titanium papers, and resin-impregnated papers wherein a resin has been previously impregnated from the viewpoint of reinforcing paper strength. Other examples of papers usable herein include linter papers, paperboards, and original papers for gypsum boards, and a group of original papers extensively used in the field of building materials, such as original materials for vinyl wall papers wherein a vinyl chloride resin layer has been provided on the surface of papers. Additional examples thereof include papers for use in office works or conventional printing or packaging, such as coated papers, art papers, vegetable parchments, glassine papers, parchment papers, paraffin-waxed papers, and Japanese papers. Further, woven fabrics or nonwoven fabrics of various fibers having appearance and properties close to papers may also be utilized as the substrate 1 although they are different from the above papers. The various fibers referred to herein include: inorganic fibers, such as glass fibers, asbestos fibers, potassium titanate fibers, alumina fibers, silica fibers, and carbon fibers; and synthetic fibers, such as polyester fibers and vinylon fibers.

Plastic films or plastic sheets include films or sheets of the following various synthetic resins. Various synthetic resins include polyethylene resins, polypropylene resins, polymethylene resins, polymethylpentyne resins, polyvinyl chloride resins, polyvinylidene chloride resins, polyvinyl alcohol resins, vinyl chloride-vinyl acetate copolymer resins, ethylene-vinyl acetate copolymer resins, ethylene-vinyl alcohol copolymer resins, polyethylene terephthalate resins, polybutylene terephthalate resins, polyethylene naphthalate-isophthalate copolymer resins, polymethyl methacrylate resins, polyethyl methacrylate resins, polybutyl acrylate resins, polyamide resins typified by nylon 6 or nylon 66, cellulose triacetate resins, cellophanes, polystyrene resins, polycarbonate resins, polyallylate resins, and polyimide resins.

The metallic foil, the metallic sheet, or the metallic plate may be made of the following metals. Specifically, aluminum, iron, stainless steel, copper or the like may be used. In some cases, plating may be applied on the metal material. Wood-based plates include wood plates, plywoods, particle boards, and medium-density fiber boards called "MDF." Ceramic materials include, for example, ceramic building materials, such as gypsum boards, calcium silicate boards, and wood chip cement boards, potteries or ceramic whitewares, glasses, porcelain enamels, and fired tiles. In addition, composites of various materials, such as a fiber-reinforced plastic plate, a laminate comprising a paper honeycomb and iron plates applied respectively onto both sides of the paper honeycomb, a polyethylene resin sandwiched between two aluminum plates, may also be used as the substrate 1.

The pattern 103 having lower air permeability than the other portions may be formed on the substrate 101 by forming a relatively thick print of a synthetic resin composition having a high film-forming property and drying or setting the coating to form a pattern of a layer which is formed of a synthetic resin, has an even thickness, has large thickness, and has only a small number of gaps or pores permeable to air. In printing by conventional gravure printing, since cell shapes of the gravure plate are reproduced, the ink is not spread to portions other than cells in the plate, that is, at bank portions. This creates gaps, and air permeates the gap portion. In order to inhibit the permeation of the air, printing should be such that the cell shapes of the plate are not reproduced.

To this end, an ink used is selected which contains a low content of an inorganic filler having an air permeability-lowering property and has a high resin solid content. Alternatively, an ink may be selected which is likely to spread towards the lateral direction upon transfer of the ink on the substrate 1 at the time of printing. Further, a plate depth is increased to increase the amount of the ink transferred, thus permitting portions corresponding to banks to be also covered with the ink by leveling. When the air permeability is measured with a Gurley densometer according to JIS P 8117, conventional original papers for building materials having an air permeability of 200 sec to less than 1,000 sec, while those having an ordinary print of a top coating composition not having a penetration-regulating property have an air permeability of 1,000 sec to 2,000 sec. Preferred inks for the formation of a pattern having low air permeability are those wherein the resin binder is a polyvinyl chloride resin, a plastisol of an acrylic resin or a urethane resin, the content of the resin binder based on the ink solid is 50 to 100% by weight, preferably 60 to 90% by weight, the content of the inorganic filler is lower than the content of the inorganic filler in the ink for the formation of other patterns and is 0.1% by weight to 30% by weight, preferably 1 to 10% by weight, based on the ink solid, and the viscosity is 10 to 5000 cps, preferably 100 to 1000 cps. Among them, an ink using a plastisol of a polyvinyl chloride resin is suitable because the solid content can be increased and, in addition, at the time of the formation of the surface protective layer using a synthetic resin composition or an ionizing radiation-curable resin composition, the penetration of the composition is not significant.

Preferred inks for printing of a woodgrain pattern including a vessel pattern are such that the binder is nitrocellulose, a blend of acrylic resin with nitrocellulose, urethane, acrylic resin, or polyvinyl chloride resin, the content of the resin binder based on the ink solid is 50 to 95% by weight, preferably 60 to 90% by weight, the content of the inorganic filler is 0.1% to 50% by weight, preferably 1 to 30% by weight, based on the ink solid, and the viscosity is 10 to 1,000 cps, preferably 50 to 300 cps.

The depth of the plate in the formation of a pattern having low air permeability by gravure printing is generally 20 to 100 $\mu$m, preferably 40 to 60 $\mu$m, and the number of lines is 100 to 20 lines/in., preferably 54 to 40 lines/in.

Incidentally, in the case of a plate in the printing of a woodgrain pattern including a vessel pattern, the depth of the plate is 20 to 100 $\mu$m, preferably 40 to 60 $\mu$m, and the number of lines in the plate is 100 to 20 lines/in., preferably 54 to 40 lines/in. In the preferred plate depth range and the preferred range of number of lines, the amount of the ink transferred is larger than that in the case of conventional printing in books. Therefore, as described above, upon the coating of the synthetic resin composition or the ionizing radiation-curable resin composition, the effect of reducing an apparent layer thickness can also be attained as a result of the penetration of the synthetic resin composition into the portion of the woodgrain pattern including the vessel pattern.

In order to impart a feeling of recesses to the vessel pattern, it is more preferred to bring the vessel portion to a more matted state than the other portions and, in addition, to provide a thick resin layer, in portions other than the vessels, so that protrusions of the portions other than the vessels can be visually distinguished. Resins usable for this purpose are those, among the above resins, which are less likely to be collapsed upon application of pressure and are excellent in processability such as adhesion. In view of the above, an ink is recommended which is produced by bringing a plastisol of a polyvinyl chloride resin to an ink and has a high resin solid content. Further, the combined use of a crosslinking agent, such as trimethylolpropane triacrylate, can cause crosslinking within the formed layer which can improve the properties of the layer.

After the provision of the pattern 103 including the vessel pattern 102 corresponding to woodgrain vessels on the substrate 101 and the pattern 4, with lower air permeability, covering portions other than portions on the vessel pattern 2 in the pattern 3, a synthetic resin composition is coated on the whole surface including the pattern 103 and the pattern 104 to provide a protective layer 105. As described above, when the portion of the pattern 103 is compared with the portion of the pattern 104, the portion of the pattern 104 has lower air permeability, or the portion of the pattern 104 is denser. Therefore, upon coating, the synthetic resin composition does not permeate the portion of the pattern 104 or does not substantially permeate the portion of the pattern 104. As a result, upon drying or setting, a layer having a smooth surface is formed on the portion of the pattern 104. On the other hand, in the portion of the vessel pattern 102, as described above, the reproduction of the cell shapes of the plate in the printing and/or the presence of a large amount of the filler permit the synthetic resin composition, used in the formation of the surface protective layer, to penetrate into the underlying layer. As a result, the surface state is not smooth and, as compared with the pattern 104 having lower air permeability, is in a highly matte state. This provides an appearance of recesses corresponding to the vessel pattern 102.

In the formation of the protective layer 105, as described above, a synthetic resin composition is coated by a conventional coating method, for example, roll coating. As a rule, in the synthetic resin composition, among plastics constituting films or sheets described above as the material for the substrate 1, those, which can be dissolved or dispersed in water or an organic solvent to prepare an ink composition, can be used. Even in the case of resins which cannot be dissolved or dispersed in water or an organic solvent, for example, in the case of a polyethylene resin, this resin can be heated to form a melt which is then extruded through a T-die to perform lamination simultaneously with film formation, thereby forming a protective layer 105. Even in this case, that is, even in the case of heat melting of the resin followed by application, the surface state of the underlying layer affects the surface state of the protective layer 105, and a smooth face is formed in portions on the pattern 104 having lower air permeability, while a layer having a surface with concaves and convexes along the surface form of the underlying vessel pattern 102 is formed in the other portions, thus providing an appearance of recesses corresponding to the vessel pattern 102. In providing the surface protective layer by using the T-die, if possible, evacuation from the substrate side can accelerate the effect.

In the formation of the protective layer, a thermosetting resin composition using a thermosetting resin or an ionizing radiation-curable resin composition may be used instead of the conventional synthetic resin composition. In this case, after coating, heating or ionizing radiation irradiation to cause curing through crosslinking can further improve physical and chemical various properties of the outermost surface. In recent years, this type of decorative materials have become applied to fields wherein melamine decorative plates have hitherto been used. Therefore, in many cases, surface durability, particularly abrasion resistance, comparable to that of melamine decorative materials is required. For this reason, attention has been drawn to a method wherein an ionizing radiation-curable resin composition is coated to form a coating which is then exposed to an ionizing radiation to cure through crosslinking. The ionizing radiation-curable resin composition may comprise a suitable mixture of prepolymers, oligomers and/or monomers having a polymerizable unsaturated bond(s) or an epoxy group(s) in the molecule thereof. The term "ionizing radiation" used herein refers to electromagnetic radiations or charged particle beams which have energy quanta capable of polymerizing or crosslinking molecules, and generally refers to, for example, ultraviolet light or electron beam.

Examples of prepolymers and oligomers usable in the ionizing radiation-curable resin composition include: unsaturated polyesters, such as condensates of unsaturated dicarboxylic acids with polyhydric alcohols, methacrylates, such as polyester methacrylates, polyether methacrylates, polyol methacrylates, and melamine methacrylates; acrylates, such as polyester acrylates, epoxy acrylates, urethane acrylates, polyether acrylates, polyol acrylates, and melamine acrylates; and cationically polymerizable epoxy compounds.

Examples of monomers usable in the ionizing radiation-curable resin composition include styrene monomers, such as styrene and α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated substituted acids, such as 2-(N,N-diethylamino)ethyl acrylate, 2-(N,N-dimethylamino)ethyl acrylate, 2-(N,N-dibenzylamino) methyl acrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, and triethylene glycol diacrylate, polyfunctional compounds, such as dipropylene glycol diacrylate, ethylene glycol diacrylate, propylene glycol dimethacrylate, and diethylene glycol dimethacrylate, and/or polythiol compounds having two or more thiol groups in a molecule thereof, for example, trimethylolpropane trithioglycolate, trimethylolpropane trithiopropylate, and pentaerythritol tetrathioglycol.

In general, in the ionizing radiation-curable resin composition, for the monomer, the above compounds may be, if necessary, used alone or as a mixture of two or more. However, in order to impart coatability on an ordinary level to the ionizing radiation-curable resin composition, preferably, the ionizing radiation-curable resin composition comprises not less than 5% by weight of the prepolymer or oligomer and not more than 95% by weight of the monomer and/or polythiol compound.

When flexibility is required of a cured product of the ionizing radiation-curable resin composition after coating, the amount of the monomer may be reduced, or alternatively a monofunctional or difunctional acrylate monomer may be used. On the other hand, when abrasion resistance, heat resistance, solvent resistance and other properties are required of the cured product of the ionizing radiation-curable resin composition after coating, a tri- or higher functional acrylate monomer may be used. Thus, the ionizing radiation-curable resin composition can be designed according to need. Examples of the monofunctional acrylate monomer include 2-hydroxy acrylate, 2-hexyl acrylate, and phenoxyethyl acrylate. Examples of the difunctional monomer include ethylene glycol diacrylate and 1,6-hexanediol diacrylate, and examples of the tri- or higher functional acrylate monomer include trimethylolpropane triacrylate, pentaerythritol triacrylate, pentaerythritol tetraacrylate, and dipentaerythritol hexaacrylate.

Further, in order to regulate properties, such as flexibility and surface hardness, of the cured product of the ionizing radiation-curable resin composition after coating, an ionizing radiation non-curing resin may be added to the ionizing radiation-curable resin composition. Specific examples of ionizing radiation non-curing resins include thermoplastic resins, such as polyurethane, cellulosic, polyvinyl butyral, polyester, acrylic, polyvinyl chloride, and polyvinyl acetate resins. Among them, polyurethane, cellulosic, and polyvinyl butyral resins are preferred from the viewpoint of improving the flexibility.

When the ionizing radiation-curable resin composition upon coating is cured by ultraviolet irradiation, a photopolymerization initiator or a photopolymerization accelerator is added. In the case of a resin system having a radical polymerizable unsaturated group, acetophenones, benzophenones, thioxanthones, benzoin, benzoin methyl ether and the like may be used alone or as a mixture of two or more as the photopolymerization initiator. On the other hand, in the case of a resin system having a cationically polymerizable functional group, aromatic diazonium salts, aromatic sulfonium salts, aromatic iodonium salts, metallocene compounds, benzoinsulfonic esters and the like may be used alone or as a mixture of two or more as the photopolymerization initiator. The amount of the photopolymerization initiator added is 0.1 to 10 parts by weight based on 100 parts by weight of the ionizing radiation-curable resin composition.

In order to improve the abrasion resistance of the protective layer in its surface, spherical particles, which are preferably inorganic and have higher hardness than the resin cured by crosslinking, are incorporated into the protective layer. The addition of spherical particles having high hardness can realize further strengthening of the surface. The spherical particles may not be necessarily truly spherical, and particles having a smooth surface suffice for contemplated results. The function of the spherical particles is such that a part thereof is protruded from the surface of the protective layer to receive the external force causative of the abrasion by the surface of the spherical particles and the spherical particles per se are gradually abraded to prevent the abrasion of the underlying layer. Spherical particles usable herein include α-alumina, silica, chromium oxide, iron oxide, diamond, and graphite. Among them, spherical α-aluminas (spherical alumina "AS-10" and "AS-50", manufactured by Showa Denko K. K.) are recommended from the viewpoint of high hardness and easy availability of spherical particles. The average diameter of the spherical particles is preferably 5 to 100 μm. In using the inorganic spherical particles in the protective layer, preferably, the spherical particles are previously treated with a silane coupling agent or the like from the viewpoint of enhancing the adhesion thereof in the resin constituting the protective layer.

Second Aspect of Invention

It is known that "cissing" of the top coat is utilized to form concaves which are utilized, for example, in the formation of concaves in woodgrain vessel grooves or the like of the decorative material.

In the field of decorative materials, there have been various grades ranging from decorative plates, using a thermosetting resin and having excellent properties, such as melamine decorative plates, to relatively simple decorative materials, such as tissue papers on which a print or a coating has been provided. In these decorative materials, the right decorative material has been used in the right application. In recent years, however, from the viewpoint of increasing the efficiency of the production process of the decorative plates, attention has been drawn to decorative plates which can be produced through a simpler process.

For example, a melamine decorative plate is produced by providing several types of materials, putting them on top of each other or one another, and hot pressing the assembly under high temperature and high pressure conditions. In the case of coated papers (paper having a top coat formed by printing a resin having excellent properties), heat or pressure required in the application onto plywoods or the like is considerably lower as compared with that required in the melamine decorative plates. Further, the lamination speed is higher. Thus, the production efficiency is high. In recent years, the appearance of decorative sheets, having excellent properties, wherein the top coat in the conventional coated paper has been formed from an ionizing radiation-curable resin composition, have led to a tendency such that, in many cases, coated papers are used as an alternative to thermosetting resin decorative plates of a melamine resin or the like.

In forming concaves utilizing "cissing," a pattern is previously formed, on the substrate, using a material which, in a later stage, can repel the coating composition for the outermost layer, and the coating composition is then coated thereon. In this case, the coating composition is repelled from the pattern portion. From before the use of ionizing radiation-curable resin compositions, this has been carried out by using coating compositions using various thermoplastic resins or heat-curable resins.

In recent years, an increase in frequency of use of the ionizing radiation-curable resin composition has lead to an attempt to substitute a top coat using an ionizing radiation-curable resin composition for the top coat in the conventional decorative sheet utilizing "cissing" of the coating composition. It is known that, principally, concaves can be formed by the same phenomenon as in the prior art.

In the coating of the ionizing radiation-curable resin composition followed by satisfactory cissing, the use of a coating composition having low viscosity, which upon cissing is likely to flow, is desired. When the viscosity is low, however, the coating composition is likely to permeate the substrate, such as paper. This reduces the thickness of the surface coating. As a result, concaves having satisfactory depth are not formed, or otherwise, the state of the surface of the substrate affects the surface of the coating, unfavorably making it difficult to form a coating having high surface gloss. Further, when the coating thickness is small, a deterioration in properties of the decorative sheet in its surface is unavoidable.

An attempt to avoid these various drawbacks through an enhancement in viscosity results in lowered fluidity of the ionizing radiation-curable resin composition. Therefore, in this case, even though the coating composition is successfully repelled on from the repellent pattern, the flow of the coating composition is unsatisfactory for the formation of concaves. As a result, sharp concaves cannot be formed.

That is, the requirement for the composition for satisfactorily ensuring the coating thickness is contradictory to the requirement for the composition for the formation of sharp concaves.

A test on properties of the surface shows that, in the edge of concaves formed as a result of cissing of the coating composition (=vicinity of boundary between bottom of concave and wall of concave), the solvent resistance and the resistance to staining are deteriorated.

For this reason, an attempt to previously form a layer using a urethane-based two-component curable resin before the formation of a coating composition-repellent pattern has been made. However, printing on the formed urethane resin layer and the adhesion of the coating are unsatisfactory, posing a practical problem.

Thus, according to the second aspect of the present invention, there is provided a method wherein, in order to satisfactorily form concaves, an ionizing radiation-curable resin composition having low viscosity is used, and, at the same time, a drawback caused by excessive penetration of the low-viscosity ionizing radiation-curable resin composition into the substrate can be eliminated.

Various materials have been studied with a view to solving the above problem. As a result, it has been found that, prior to the formation of a pattern capable of repelling the coating of the overlying ionizing radiation-curable resin composition, the formation of a coating capable of inhibiting the penetration of the ionizing radiation-curable resin composition into the substrate over the whole surface can solve the above problem.

Thus, the decorative material according to the second aspect of the present invention comprises: a substrate penetrable with an ionizing radiation-curable resin composition; a penetration-inhibiting coating, provided on the substrate, formed of a material capable of inhibiting the penetration of the ionizing radiation-curable resin composition; a cissing pattern provided on the penetration-inhibiting coating, for repelling the ionizing radiation-curable resin composition; and a top coat provided on the penetration-inhibiting coating including the cissing pattern, the top coat being formed of an ionizing radiation-cured resin composition, concaves being defined by the top coat, the concaves having been formed as a result of cissing of the ionizing radiation-curable resin composition from on the cissing pattern in the course of the formation of the top coat from the ionizing radiation-curable resin composition.

Preferably, the penetration-inhibiting coating has been formed from a composition composed mainly of an oil-resistant resin. The oil-resistant resin is preferably selected from the group consisting of a polyvinylbutyral resin, a polyvinyl alcohol resin, an acrylic resin, and a mixture of at least one of the resins with a thermosetting resin. Further, preferably, the oil-resistant resin comprises a thermosetting resin and an ionizing radiation-curable prepolymer, oligomer, or monomer.

According to other preferred embodiment of the present invention, the top coat contains spherical particles. In this case, the diameter of the spherical particles is preferably 30 to 200% of the thickness of the top coat.

According to another preferred embodiment of the present invention, the penetration-inhibiting coating functions also as a stress-relaxing layer for relaxing shrinkage stress caused at the time of curing of the ionizing radiation-curable resin for the formation of the ionizing radiation-cured resin constituting the top coat. Particularly preferably, the penetration-inhibiting coating has a yield strength of not less than 0.6 kgf, more preferably 0.6 to 3.0 kgf, and a breaking strength of not less than 1.0 kgf, more preferably 1.0 to 4.0 kgf. The yield strength and the breaking strength are measured in such a manner that two biaxially stretched polyethylene terephthalate film strips having a thickness of 50 μm and a width of 10 mm are laminated on top of the other through a 3 μm-thick primer layer so as for the end of one of the strips to overlap with the end of the other strip by 10 mm and, in this state, the two biaxially stretched polyethylene terephthalate film strips are pulled at a temperature of 70° C. in opposite directions.

Further, according to the present invention, preferably, concaves consistent with the cissing pattern are provided to impart a feeling of concaves and convexes consistent with the pattern.

Decorative materials according to the present invention are shown in FIGS. 4 to 6. All the decorative materials shown in FIGS. 4 to 6 have a woodgrain pattern. The decorative material according to the present invention, however, is not limited to those having a woodgrain pattern.

The decorative material according to the present invention will be described with reference to FIG. 4. Numeral 31 designates a substrate which is penetrable with an ionizing radiation-curable resin composition. Numeral 32 is an even colored layer which, in the field of printing, is called "solid print layer." This print layer is colored with a color of highlight portion in a woodgrain pattern. Numeral 33 designates a woodgrain design which renders a shading pattern of woodgrains in portions left after removal of the hilight and the vessel groove pattern from the woodgrain pattern. In this case, the term "woodgrain pattern" used herein refers to a pattern in such a state that a color coating, which is commonly determined depending upon the type of trees, has been provided. Exceptionally, a woodgrain in the state of an unpainted wood is sometimes used. Such woodgrains are also embraced in the present invention. The layer 33 is represented by a parallel oblique line portion and a portion not having the parallel oblique line. Because the layer 33 is generally formed by printing, this is to indicate the presence of a thick ink coating portion and a thin ink coating portion or a portion free from any coating.

Numeral 34 designates a penetration-inhibiting coating capable of inhibiting the penetration of an ionizing radiation-curable resin composition. Numeral 35 designates a cured product of an ionizing radiation-curable resin composition coating. This cured product defines concaves formed as a result of cissing of the ionizing radiation-curable resin composition from on a cissing pattern 36, capable of repelling the ionizing radiation-curable resin composition, at the time of the formation of the cured product.

FIGS. 5 and 6 shows other embodiments of the present invention. In FIG. 5, the penetration-inhibiting coating 34 is provided between the even colored layer 32 and the woodgrain design 33. On the other hand, in FIG. 6, the penetration-inhibiting coating 34 is provided between the substrate 1 and the even colored layer 32. The penetration-inhibiting coating 34 may be provided at any position so far as the coating 34 is located between the substrate and the cissing pattern 36. The reason for this is that the layer 33 is usually very thin and, in some cases, contains a pigment, permitting the ionizing radiation-curable resin composition to penetrate into the layer 33.

The substrate 31 may have no or low penetrability with the ionizing radiation-curable resin composition. In consideration of the subject matter of the present invention, however, substrates penetrable with the ionizing radiation-curable resin composition are mainly used. Roughly, not only various papers, nonwoven fabrics or woven fabrics, but also plastic films or plastic sheets, which, when they are porous or contain a large amount of a filler, can be impregnated with the ionizing radiation-curable resin composition, are usable. Further, fiber-reinforced plastic boards and the like can be also impregnated with the liquid resin composition, and thus can be used. Wood-based substrates can be impregnated with the ionizing radiation-curable resin composition and thus can be used, and examples thereof include wood plates, plywoods, particle boards, and medium-density fiber boards called "MDF." In addition, composites of the materials belonging to the same group, such as composites between papers, and composites between materials belonging to different groups described above may also be used. Furthermore, for example, steel wools formed by bringing a metal into a fiber may also be used.

Typical examples of papers usable herein include tissue papers, kraft papers, and titanium papers. Resin-impregnated papers, wherein a resin has been previously impregnated from the viewpoint of increasing paper strength, can be impregnated and thus can be used. Other examples of papers usable herein include linter papers, paperboards, and original papers for gypsum boards. A group of original papers extensively used in the field of building materials, such as original materials for vinyl wall papers wherein a vinyl chloride resin layer having a high filler content has been provided on the surface of papers, may also be used. Additional examples thereof include papers for use in office works or conventional printing or packaging, such as coated papers, art papers, vegetable parchments, glassine papers, parchment papers, paraffin-waxed papers, and Japanese papers. Further, woven fabrics or nonwoven fabrics of various fibers having appearance and properties close to papers may also be utilized as the substrate for the decorative material although they are different from the above papers. The various fibers referred to herein include: inorganic fibers, such as glass fibers, asbestos fibers, potassium titanate fibers, alumina fibers, silica fibers, and carbon fibers; and synthetic fibers, such as polyester fibers and vinylon fibers.

Various plastic films, which are porous or contain a large amount of a filler, or plastics constituting the plastic sheet may be used, and specific examples thereof include films or sheets of the following various synthetic resins. Various synthetic resins include polyethylene resins, polypropylene resins, polymethylene resins, polymethylpentene resins, polyvinyl chloride resins, polyvinylidene chloride resins, polyvinyl alcohol resins, vinyl chloride-vinyl acetate copolymer resins, ethylene-vinyl acetate copolymer resins, ethylene-vinyl alcohol copolymer resins, polyethylene terephthalate resins, polybutylene terephthalate resins, polyethylene naphthalate-isophthalate copolymer resins, polymethyl methacrylate resins, polyethyl methacrylate resins, polybutyl acrylate resins, polyamide resins typified by nylon 6 or nylon 66, cellulose triacetate resins, cellophanes, polystyrene resins, polycarbonate resins, polyallylate resins, and polyimide resins.

The even colored layer 32, the woodgrain design 33, and the cissing pattern 36 are generally formed by printing. In this case, although any printing method may be used, gravure printing is preferred for the reason that the range of selection of the binder resin in the ink is broad and the amount of the ink transferred is preferably large because the penetrable substrate is generally porous. However, other printing methods may also be used.

The ink for printing the even colored layer 32 and the woodgrain design 33 preferably has some penetrability into the substrate from the viewpoint of reinforcing the substrate. Further, the ink desirably has affinity to such an extent that, at the time of the formation of the penetration-inhibiting coating or of coating of the ionizing radiation-curable resin composition, has adhesion although the ink neither flows as a result of dissolution nor bleeds.

For example, cellulosic resins, such as ethylcellulose, nitrocellulose, cellulose acetate, and cellulose acetate buryrate are suitable as a binder.

Further, a thermosetting polyurethane resin ink may be used.

Since the cissing pattern 36 is located at the uppermost position, the ink for the formation of the cissing pattern 36 should have adhesion to the underlying layer and, at the same time, should be a tough layer.

For example, an aminoalkyd resin or a thermosetting urethane resin is suitable as a binder for an ink composition for forming a cissing pattern 36.

Alternatively, an ink, for a cissing pattern, containing an ionizing radiation-curable resin composition may be used to form a cissing pattern 36.

Further, a material for repelling the ionizing radiation-curable resin composition coated on the cissing pattern, such as a silicone resin, a fluororesin, or a wax, may be added, followed by milling to prepare an ink composition which is then used in the formation of the cissing pattern 36.

As described above in connection with FIGS. 4 to 6, there is a possibility that the penetration-inhibiting coating 34 capable of inhibiting the penetration of the ionizing radiation-curable resin composition is formed in various positions. Therefore, the penetration-inhibiting coating 34 should have adhesion to all the substrate, the even colored layer 32, the woodgrain design 33, and the cissing pattern 36, and should, of course, also have adhesion to the ionizing radiation-curable resin composition. However, the formation of a coating having porosity large enough to permit penetration of the ionizing radiation-curable resin composition is not always required. Further, at the time of the coating of the ionizing radiation-curable resin composition, the penetration-inhibiting coating should not be dissolved except for the dissolution of a very small part thereof.

From these viewpoints, the binder for the coating composition for the formation of the penetration-inhibiting coating is preferably a binder which is soluble in an alcohol and water and has relatively high polarity, and specific example of suitable binders include polyvinyl butyral resin, polyvinyl alcohol resin, and various acrylic resins.

Acrylic resins usable herein include methyl methacrylate, methyl acrylate, ethyl acrylate, n-butyl acrylate, isobutyl acrylate, t-butyl acrylate, and 2-ethylhexyl acrylate which are generally used. Other acrylic resins may also be used.

Thermosetting resins, such as polyurethane resins, may be added to the polyvinyl butyral resin, the polyvinyl alcohol resin, or the various acrylic resins.

A mixture of a thermosetting resin, such as a polyurethane resin, with an ionizing radiation-curable prepolymer, oligomer, or monomer may be used as a binder for the coating composition for the penetration-inhibiting coating. A preferred example thereof is a mixture of a thermosetting component comprising a polyol of an acrylic polyol or a polyester polyol and an isocyanate, such as a hexamethylene diisocyanate, with an ionizing radiation-curable prepolymer or oligomer, such as an unsaturated polyester. The ionizing radiation-curable prepolymer, oligomer, or monomer may be the same as those used in a coating of the ionizing radiation-curable resin composition described below.

The coating composition, for the penetration-inhibiting coating, using these resins may be coated by gravure printing, roll coating or the like. When the coating thickness is excessively large, the penetration-inhibiting coating per se is not very tough although the penetration-inhibiting effect is attained. Therefore, the binder is preferably minimized from the viewpoint of preventing the deterioration in properties of the ionizing radiation-cured resin composition coating. The coating thickness is preferably about 1 to 5 $\mu$m on a dry basis although the thickness may vary depending upon the penetrability of the substrate with the ionizing radiation-curable resin composition.

The ionizing radiation-curable resin composition to be coated on the outermost layer may be any conventional one, and may comprise a suitable mixture of prepolymers, oligomers and/or monomers having a polymerizable unsaturated bond(s) or an epoxy group(s) in the molecule thereof. The term "ionizing radiation" used herein refers to electromagnetic radiations or charged particle beams which have energy quanta capable of polymerizing or crosslinking molecules, and generally refers to, for example, ultraviolet light or electron beam.

Examples of prepolymers and oligomers usable in the ionizing radiation-curable resin composition include: unsaturated polyesters, such as condensates of unsaturated dicarboxylic acids with polyhydric alcohols; methacrylates, such as polyester methacrylates, polyether methacrylates, polyol methacrylates, and melamine methacrylates; acrylates, such as polyester acrylates, epoxy acrylates, urethane acrylates, polyether acrylates, polyol acrylates, and melamine acrylates; and cationically polymerizable epoxy compounds.

Examples of monomers usable in the ionizing radiation-curable resin composition include styrene monomers, such as styrene and α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated substituted acids, such as 2-(N,N-diethylamino)ethyl acrylate, 2-(N,N-dimethylamino)ethyl acrylate, 2-(N,N-dibenzylamino) methyl acrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, and triethylene glycol diacrylate, polyfunctional compounds, such as dipropylene glycol diacrylate, ethylene glycol diacrylate, propylene glycol dimethacrylate, and diethylene glycol dimethacrylate, and/or polythiol compounds having two or more thiol groups in a molecule thereof, for example, trimethylolpropane trithioglycolate, trimethylolpropane trithiopropylate, and pentaerythritol tetrathioglycolate.

In general, in the ionizing radiation-curable resin composition, for the monomer, the above compounds may be, if necessary, used alone or as a mixture of two or more. However, in order to impart coatability on an ordinary level to the ionizing radiation-curable resin composition, preferably, the ionizing radiation-curable resin composition comprises not less than 5% by weight of the prepolymer or oligomer and not more than 95% by weight of the monomer and/or polythiol compound.

When flexibility is required of a cured product of the ionizing radiation-curable resin composition after coating, the amount of the monomer may be reduced, or alternatively a monofunctional or difunctional acrylate monomer may be used. On the other hand, when abrasion resistance, heat resistance, and solvent resistance are required of the cured product of the ionizing radiation-curable resin composition after coating, a tri- or higher functional acrylate monomer may be used. Thus, the ionizing radiation-curable resin composition can be designed according to need. Examples of the monofunctional acrylate monomer include 2-hydroxy acrylate, 2-hexyl acrylate, and phenoxyethyl acrylate. Examples of the difunctional monomer include ethylene glycol diacrylate and 1,6-hexanediol diacrylate, and examples of the tri- or higher functional acrylate monomer include trimethylolpropane triacrylate, pentaerythritol triacrylate, pentaerythritol tetraacrylate, and dipentaerythritol hexaacrylate.

Further, in order to regulate properties, such as flexibility and surface hardness, of the cured product of the ionizing radiation-curable resin composition after coating, an ionizing radiation non-curing resin may be added to the ionizing radiation-curable resin composition. Specific examples of ionizing radiation non-curable resins include thermoplastic resins, such as polyurethane, cellulosic, polyvinyl butyral, polyester, acrylic, polyvinyl chloride, and polyvinyl acetate resins. Among them, polyurethane, cellulosic, and polyvinyl butyral resins are preferred from the viewpoint of improving the flexibility.

When the ionizing radiation-curable resin composition upon coating is cured by ultraviolet irradiation, a photopolymerization initiator or a photopolymerization accelerator is added. In the case of a resin system having a radical polymerizable unsaturated group, acetophenones, benzophenones, thioxanthones, benzoin, benzoin methyl ether and the like may be used alone or as a mixture of two or more as the photopolymerization initiator. On the other hand, in the case of a resin system having a cationically polymerizable functional group, aromatic diazonium salts, aromatic sulfonium salts, aromatic iodonium salts, metallocene compounds, benzoinsulfonic esters and the like may be used alone or as a mixture of two or more as the photopolymerization initiator. The amount of the photopolymerization initiator added is 0.1 to 10 parts by weight based on 100 parts by weight of the ionizing radiation-curable resin composition.

In order to improve the abrasion resistance of the outermost surface, spherical particles, which are preferably inorganic and have higher hardness than the resin cured by crosslinking, are incorporated into the ionizing radiation-curable resin composition. The addition of spherical particles having high hardness can realize further strengthening of the surface. The spherical particles may not be necessarily truly spherical, and particles having a smooth surface suffice for contemplated results. The function of the spherical particles is such that a part thereof is protruded from the surface of the protective layer to receive the external force causative of the abrasion by the surface of the spherical particles and the spherical particles per se are gradually abraded to prevent the abrasion of the underlying layer. Spherical particles usable herein include α-alumina, silica, chromium oxide, iron oxide, diamond, and graphite. Among them, spherical α-aluminas (spherical alumina "AS-10" to "AS-50", manufactured by Showa Denko K. K.) are recommended from the viewpoint of high hardness and easy availability of spherical particles. The average diameter of the spherical particles is preferably 5 to 100 µm, more preferably 3 to 50 µm. The particle diameter is preferably 30 to 200% of the coating thickness from the viewpoint of the abrasion resistance. In using the inorganic spherical particles in the surface protective layer, preferably, the spherical particles are previously treated with a silane coupling agent or the like from the viewpoint of enhancing the adhesion thereof in the resin constituting the surface protective layer.

Third Aspect of Invention

A conventional decorative sheet is such that, after the formation of a conventional design print layer on a paper substrate, such as a tissue paper, a top layer of a crosslinked resin is formed from an ionizing radiation-curable resin, a thermosetting resin or the like.

When a matte top layer of the crosslinked resin in the decorative sheet is contemplated, the slipperiness is unfavorably deteriorated because a matting agent having a larger particle diameter than the resin layer thickness is used and, in addition, the amount of the matting agent added is large. This poses problems including that scratches occur in spite of good surface properties at the time of processing of the laminated decorative plates, the decorative plate cannot be carried while sliding, and an attempt to forcibly carry the decorative plate causes the roughness of the surface to scratch the urethane-coated paper on the backside of the decorative plate.

The third aspect of the present invention can solve the problems of the prior art, and provides a decorative sheet which has improved slipperiness while enjoying good matting effect.

The decorative material according to this aspect of the present invention comprises: a paper substrate; and, provided on the paper substrate, at least a print layer, a sealer layer, and a top layer of a crosslinked resin, the top layer of the crosslinked resin being regulated to a coefficient of dynamic friction of 0.3 to 0.6 in the gloss (75 degrees) range of 10 to 50. The print layer may comprise a colored solid print layer and/or a pattern layer.

FIG. 7 is a diagram showing the layer construction of the decorative sheet according to the present invention. As shown in the drawing, the decorative sheet is produced by forming a print layer 72 (in this embodiment, a colored solid print layer 73 and a design layer 74) on a paper substrate 71, forming a sealer layer 75 so as to cover the print layer 72, and forming a top layer 76 of a crosslinked resin. As described above, this decorative sheet has been regulated to a coefficient of dynamic friction of 0.3 to 0.6 when the gloss (75 degrees) of the top layer 76 of the crosslinked resin is in the range of 10 to 50.

The gloss is known, and, according to the present invention, is measured with a "75-degree gloss meter," manufactured by Gardner. The coefficient of dynamic friction is also known, and, according to the present invention, is measured with Slip/Peel Tester SP-102C-3M90, manufactured by IMASS.

According to the decorative sheet having the above construction, the provision of the sealer layer underlying the top layer of the crosslinked resin enables satisfactory matting effect to be attained by the mere addition of a small amount of a matting agent having a small particle diameter to the top layer of the crosslinked resin. Further, in a good surface gloss state, that is, in the gloss (75 degrees) range of 10 to 50, the coefficient of dynamic friction could have been brought to not more than 0.6. This can maintain the surface having good abrasion resistance and good slipperiness. When the coefficient of dynamic friction is not more than 0.3, there is a fear that, upon stacking of decorative plates on top of one another, the decorative plates are excessively slid and dropped. For this reason, the coefficient of dynamic friction has been regulated to 0.3 to 0.6.

Paper substrates usable herein include base papers for decorative papers, such as tissue papers, resin-blended papers, and titanium papers.

The print layer may comprise a colored solid print layer and/or a design layer.

Crosslinkable resins usable for the formation of the top layer of the crosslinked resin include resins commonly used as crosslinkable resins for conventional decorative materials, such as ionizing radiation-curable resins and thermosetting resins (including cold setting resins and two-component reaction-curable resins). Among them, ionizing radiation-curable resins have high curing speed and good workability, and, in addition, properties of the resin, such as softness and hardness, can be easily regulated. In these crosslinkable resins, spherical particles are dispersed in uncrosslinked resins, and the dispersion is then coated, followed by curing through crosslinking to form a coating. In the crosslinkable resins, the higher the crosslinking density, the better the abrasion resistance. In this case, however, the softness is lowered. Therefore, preferably, the crosslinking density of the crosslinked resin is suitably selected depending upon abrasion resistance and softness required, for example, in the applications of decorative sheets while taking into consideration the type of the substrate and the like.

The ionizing radiation-curable resin used as the crosslinkable resin may comprise a suitable mixture of prepolymers, oligomers and/or monomers having a polymerizable unsaturated bond(s) or an epoxy group(s) in the molecule thereof. The term "ionizing radiation" used herein refers to electromagnetic radiations or charged particle beams which have energy quanta capable of polymerizing or crosslinking molecules, and generally refers to, for example, ultraviolet light or electron beam.

Examples of prepolymers and oligomers include: unsaturated polyesters, such as condensates of unsaturated dicarboxylic acids with polyhydric alcohols; methacrylates, such as polyester methacrylates, polyether methacrylates, polyol methacrylates, and melamine methacrylates; acrylates, such as polyester acrylates, epoxy acrylates, urethane acrylates, polyether acrylates, polyol acrylates, and melamine acrylates; and cationically polymerizable epoxy compounds.

Examples of monomers include styrene monomers, such as styrene and α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated substituted acids, such as 2-(N,N-diethylamino)ethyl acrylate, 2-(N,N-diethylamino)ethyl methacrylate, 2-(N,N-dibenzylamino) methyl acrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, and triethylene glycol diacrylate, polyfunctional compounds, such as dipropylene glycol diacrylate, ethylene glycol diacrylate, propylene glycol dimethacrylate, and diethylene glycol dimethacrylate, and/or polythiol compounds having two or more thiol groups in a molecule thereof, for example, trimethylolpropane trithioglycolate, trimethylolpropane trithiopropylate, and pentaerythritol tetrathioglycol.

In general, for the monomer, the above compounds may be, if necessary, used alone or as a mixture of two or more. However, in order to impart coatability on an ordinary level to the ionizing radiation-curable resin, preferably, the ionizing radiation-curable resin comprises not less than 5% by weight of the prepolymer or oligomer and not more than 95% by weight of the monomer and/or polythiol compound.

When flexibility is required of a cured product of the ionizing radiation-curable resin after coating, the amount of the monomer may be reduced, or alternatively a monofunctional or difunctional acrylate monomer may be used. On the other hand, when abrasion resistance, heat resistance, and solvent resistance are required of the cured product of the ionizing radiation-curable resin after coating, a tri- or higher functional acrylate monomer may be used. Thus, the ionizing radiation-curable resin can be designed according to need. Examples of the monofunctional acrylate monomer include 2-hydroxy acrylate, 2-hexyl acrylate, phenoxyethyl acrylate, and 1,6-hexanediol diacrylate, and examples of the tri- or higher functional acrylate monomer include trimethylolpropane triacrylate, pentaerythritol triacrylate, pentaerythritol tetraacrylate, and dipentaerythritol hexaacrylate.

Further, in order to regulate properties, such as flexibility and surface hardness, of the cured product of the ionizing radiation-curable resin after coating, an ionizing radiation non-curable resin may be added to the ionizing radiation-curable resin. Specific examples of ionizing radiation non-curable resins include thermoplastic resins, such as polyurethane, cellulosic, polyvinyl butyral, polyester, acrylic, polyvinyl chloride, and polyvinyl acetate resins. Among them, polyurethane, cellulosic, and polyvinyl butyral resins are preferred from the viewpoint of improving the flexibility.

When the ionizing radiation-curable resin upon coating is cured by ultraviolet irradiation, a photopolymerization initiator or a photopolymerization accelerator is added. In the case of a resin having a radical polymerizable unsaturated group, acetophenones, benzophenones, thioxanthones, benzoin, benzoin methyl ether and the like may be used alone or as a mixture of two or more as the photopolymerization initiator. On the other hand, in the case of a resin system having a cationically polymerizable functional group, aromatic diazonium salts, aromatic sulfonium salts, aromatic iodonium salts, metallocene compounds, benzoinsulfonic esters and the like may be used alone or as a mixture of two or more as the photopolymerization initiator. The amount of the photopolymerization initiator added is 0.1 to 10 parts by weight based on 100 parts by weight of the ionizing radiation-curable resin.

Specific examples of thermosetting resins usable as the crosslinkable resin include phenolic resin, urea resin, diallyl phthalate resin, melamine resin, guanamine resin, unsaturated polyester resin, polyurethane resin (including two-component system polyurethane), epoxy resin, aminoalkyd resin, melamine-urea co-condensed resin, silicone resin, and polysiloxane resin. If necessary, curing agents, such as crosslinking agents and polymerization initiators, and polymerization accelerators may be added to the resin. Regarding the curing agent, an isocyanate or a salt of an organic sulfonic acid is generally used for unsaturated polyester resins and polyurethane resins; amines are generally used for epoxy resins; and peroxides, such as methyl ethyl ketone peroxide, and radical initiators, such as azoisobutyronitrile, are generally used for unsaturated polyesters and the like.

The isocyanate may be an aliphatic or aromatic di- or higher functional isocyanate with an aliphatic isocyanate being preferred from the viewpoint of thermal discoloration resistance and weathering resistance. Specific isocyanates usable herein include tolylene diisocyanate, xylylene diisocyanate, 4,4'-diphenylmethane diisocyanate, hexanemethylene diisocyanate, and lysine diisocyanate.

An example of the two-component polyurethane is a mixture of a first liquid comprising a polyol compound having in its molecule two or more hydroxyl groups on the average and a second liquid comprising a polyisocyanate compound, the mixing ratio being such that the equivalent ratio of hydroxyl group to isocyanate group is 0.7 to 1.5.

An examples of the epoxy resin is a mixture of an epoxy resin having in its molecule two or more epoxy groups on the average and a mono- or polyamine having, in one molecule, three or more active hydrogen atoms reactive with epoxy groups, the ratio of the epoxy equivalent of the epoxy resin to the active hydrogen equivalent of the mono- or polyamine being 0.7 to 1.5.

The sealer layer provided between the print layer and the top layer may be formed of any conventional synthetic resin. Preferred synthetic resins usable herein include acrylic resin, butyral resin, and urethane resin. When an ionizing radiation-curable resin is used for the formation of the top layer of a crosslinked resin, the use of a butyral resin/urethane resin is preferred from the viewpoints of adhesion and properties.

If necessary, the sealer layer contains a matting agent. Conventional inorganic or organic fillers may be used as the matting agent, and examples thereof include: inorganic particles, such as particles of silica, alumina and silicone resins; and powders or beads of organic materials, such as phenolic resin and polyethylene. In particular, silica having a particle diameter of 1 to 10 $\mu$m is preferred because excellent dispersion stability of ink and properties are provided.

According to a preferred embodiment of the present invention, the sealer layer functions also as a stress-relaxing layer for relaxing shrinkage stress caused at the time of curing of the ionizing radiation-curable resin for the formation of the ionizing radiation-cured resin constituting the top coat. Particularly preferably, the penetration-inhibiting coating has a yield strength of not less than 0.6 kgf, more preferably 0.6 to 3.0 kgf, and a breaking strength of not less than 1.0 kgf, more preferably 1.0 to 4.0 kgf. The yield strength and the breaking strength are measured in such a manner that two biaxially stretched polyethylene terephthalate film strips having a thickness of 50 $\mu$m and a width of 10 mm are laminated on top of the other through a 3 $\mu$m-thick primer layer so as for the end of one of the strips to overlap with the end of the other strip by 10 mm and, in this state, the two biaxially stretched polyethylene terephthalate film strips are pulled at a temperature of 70° C. in opposite directions.

Fourth Aspect of Invention

In decorative sheets for use in places wherein water is used, in general, coated papers using papers having good water permeability and coated papers using papers having high water resistance have been used as paper substrates. Since, however, these coated papers generally having a thickness of not less than 80 $\mu$m, the handleability is poor. Further, these coated papers have poor adhesion to the substrate, as well as to prinking inks.

According to the fourth aspect of the present invention, there is provided a decorative material which has good water resistance without sacrificing particularly the adhesion to the substrate and to the printing ink.

Specifically, the decorative material according to the fourth aspect of the present invention comprises: a substrate formed of paper; a first sealer layer provided on the substrate; a print layer provided on the first sealer layer; a second sealer layer provided on the print layer; a top coat provided on the second sealer layer, the top coat comprising a crosslinked resin, the total thickness of the layers being not more than 50 $\mu$m.

According to a preferred embodiment of the present invention, the decorative material has a moisture permeability after 24 hr of not more than 600 g/m$^2$ as measured according to the cup method specified in JIS.

According to a further preferred embodiment of the present invention, the top coat comprises an ionizing radiation-cured resin. According to another preferred embodiment of the present invention, the top coat contains a water-repellent material.

According to a further preferred embodiment of the present invention, the top coat contains a hydrophobic silica.

According to a further preferred embodiment of the present invention, the first sealer layer and/or the second sealer layer are formed of a crosslinked resin.

FIG. 8 shows the layer construction of the decorative sheet according to this aspect of the present invention. The decorative sheet shown in the drawing may be produced by forming a lower sealer layer 82 on a paper substrate 1, forming a print layer 83 (in this embodiment, a colored solid print layer 83*a* and a design layer 83*b*) on the sealer layer 82, forming an upper sealer layer 84 so as to cover the print layer 83, and then forming a top layer 85 of a crosslinked resin. In this layer construction, the lower sealer layer 82 functions to seal the paper substrate 1, while the upper sealer layer 84 functions to smoothen the top layer 85 of the crosslinked resin. This decorative sheet has a moisture permeability after 24 hr of not more than 600 g/m$^2$ as measured according to the cup method specified in JIS.

The paper substrate has good water permeability. Specifically, base papers for decorative sheets, having a basis weight of about 20 to 50 g/m$^2$, such as tissue papers, kraft papers, linter papers, wood free papers, and Japanese papers, may be used.

The print layer may comprise any one of the colored solid print layer and the design layer, or alternatively, as shown in FIG. 8, may comprise both the colored solid print layer and the design layer.

Crosslinkable resins usable for the formation of the top layer include resins commonly used as crosslinkable resins for conventional decorative materials, such as ionizing radiation-curable resins and thermosetting resins (including cold setting resins and two-component reaction-curable resins). Among them, ionizing radiation-curable resins have high curing speed and good workability, and, in addition, properties of the resin, such as softness and hardness, can be easily regulated. In these crosslinkable resins, spherical particles are dispersed in uncrosslinked resins, and the dispersion is then coated, followed by curing through crosslinking to form a coating. In the crosslinkable resins, the higher the crosslinking density, the better the abrasion resistance. In this case, however, the softness is lowered. Therefore, preferably, the crosslinking density of the crosslinked resin is suitably selected depending upon abrasion resistance and softness required, for example, in the applications of decorative sheets while taking into consideration the type of the substrate and the like.

The ionizing radiation-curable resin used as the crosslinkable resin may comprise a suitable mixture of prepolymers, oligomers and/or monomers having a polymerizable unsaturated bond(s) or an epoxy group(s) in the molecule thereof. The term "ionizing radiation" used herein refers to electromagnetic radiations or charged particle beams which have energy quanta capable of polymerizing or crosslinking molecules, and generally refers to ultraviolet light or electron beam.

Examples of prepolymers and oligomers include: unsaturated polyesters, such as condensates of unsaturated dicarboxylic acids with polyhydric alcohols; methacrylates, such as polyester methacrylates, polyether methacrylates, polyol methacrylates, and melamine methacrylates; acrylates, such as polyester acrylates, epoxy acrylates, urethane acrylates, polyether acrylates, polyol acrylates, and melamine acrylates; and cationically polymerizable epoxy compounds.

Examples of monomers include styrene monomers, such as styrene and α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated substituted acids, such as 2-(N,N-diethylamino)ethyl acrylate, 2-(N,N-diethylamino)ethyl methacrylate, 2-(N,N-dibenzylamino) methyl acrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, and triethylene glycol diacrylate, polyfunctional compounds, such as dipropylene glycol diacrylate, ethylene glycol diacrylate, propylene glycol dimethacrylate, and diethylene glycol dimethacrylate, and/or polythiol compounds having two or more thiol groups in a molecule thereof, for example, trimethylolpropane trithioglycolate, trimethylolpropane trithiopropylate, and pentaerythritol tetrathioglycol.

In general, for the monomer, the above compounds may be, if necessary, used alone or as a mixture of two or more. However, in order to impart coatability on an ordinary level to the ionizing radiation-curable resin, preferably, the ionizing radiation-curable resin comprises not less than 5% by weight of the prepolymer or oligomer and not more than 95% by weight of the monomer and/or polythiol compound.

When flexibility is required of a cured product of the ionizing radiation-curable resin after coating, the amount of the monomer may be reduced, or alternatively a monofunctional or difunctional acrylate monomer may be used. On the other hand, when abrasion resistance, heat resistance, and solvent resistance are required of the cured product of the ionizing radiation-curable resin after coating, a tri- or higher functional acrylate monomer may be used. Thus, the ionizing radiation-curable resin can be designed according to need. Examples of the monofunctional acrylate monomer include 2-hydroxy acrylate, 2-hexyl acrylate, phenoxyethyl acrylate, and 1,6-hexanediol diacrylate, and examples of the tri- or higher functional acrylate monomer include trimethylolpropane triacrylate, pentaerythritol triacrylate, pentaerythritol tetraacrylate, and dipentaerythritol hexaacrylate.

Further, in order to regulate properties, such as flexibility and surface hardness, of the cured product of the ionizing radiation-curable resin after coating, an ionizing radiation non-curable resin may be added to the ionizing radiation-curable resin. Specific examples of ionizing radiation non-curable resins include thermoplastic resins, such as polyurethane, cellulosic, polyvinyl butyral, polyester, acrylic, polyvinyl chloride, and polyvinyl acetate resins. Among them, polyurethane, cellulosic, and polyvinyl butyral resins are preferred from the viewpoint of improving the flexibility.

When the ionizing radiation-curable resin upon coating is cured by ultraviolet irradiation, a photopolymerization initiator or a photopolymerization accelerator is added. In the case of a resin having a radical polymerizable unsaturated group, acetophenones, benzophenones, thioxanthones, benzoin, benzoin methyl ether and the like may be used alone or as a mixture of two or more as the photopolymerization initiator. On the other hand, in the case of a resin system having a cationically polymerizable functional group, aromatic diazonium salts, aromatic sulfonium salts, aromatic iodonium salts, metallocene compounds, benzoinsulfonic esters and the like may be used alone or as a mixture of two or more as the photopolymerization initiator. The amount of the photopolymerization initiator added is 0.1 to 10 parts by weight based on 100 parts by weight of the ionizing radiation-curable resin.

Specific examples of thermosetting resins usable as the crosslinkable resin include phenolic resin, urea resin, diallyl phthalate resin, melamine resin, guanamine resin, unsaturated polyester resin, polyurethane resin (including two-component system polyurethane), epoxy resin, aminoalkyd resin, melamine-urea co-condensed resin, silicone resin, and polysiloxane resin. If necessary, curing agents, such as crosslinking agents and polymerization initiators, and polymerization accelerators may be added to the resin. Regarding the curing agent, an isocyanate or a salt of an organic sulfonic acid is generally used for unsaturated polyester resins and polyurethane resins; amines are generally used for epoxy resins; and peroxides, such as methyl ethyl ketone peroxide, and radical initiators, such as azoisobutyronitrile, are generally used for unsaturated polyesters and the like.

The isocyanate may be an aliphatic or aromatic di- or higher functional isocyanate with an aliphatic isocyanate being preferred from the viewpoint of thermal discoloration resistance and weather resistance. Specific isocyanates usable herein include tolylene diisocyanate, xylylene diisocyanate, 4,4'-diphenylmethane diisocyanate, hexanemethylene diisocyanate, and lysine diisocyanate.

An example of the two-component polyurethane is a mixture of a first liquid comprising a polyol compound having in its molecule two or more hydroxyl groups on the average and a second liquid comprising a polyisocyanate compound, the mixing ratio being such that the equivalent ratio of hydroxyl group to isocyanate group is 0.7 to 1.5.

An examples of the epoxy resin is a mixture of an epoxy resin having in its molecule two or more epoxy groups on the average and a mono- or polyamine having, in one molecule, three or more active hydrogen atoms reactive with epoxy groups, the ratio of the epoxy equivalent of the epoxy resin to the active hydrogen equivalent of the mono- or polyamine being 0.7 to 1.5.

If necessary, the top layer of the crosslinked resin may contain a water-repellent material from the viewpoint of improving the water resistance. Any conventional water-repellent material may be used, and preferred examples thereof include silicon, fluorine, aliphatic hydrocarbon and other compound.

Further, if necessary, the top layer of the crosslinked resin may contain hydrophobic silica from the viewpoint of improving the water resistance. The hydrophobic silica refers to a silica which has been surface treated with an inorganic or organic material. Fundamentally, in the hydrophobic silica, —OH groups on the surface of silica have been brought to hydrophobic groups.

The sealer layer may be formed from any conventional thermoplastic resin or crosslinkable resin. A urethane resin comprising a polyol and an isocyanate is preferred from the viewpoints of the adhesion to paper substrate, the rigidity and elasticity of the resin, and curling of the paper substrate.

According to other preferred embodiment of the present invention, the first sealer layer and/or the second sealer layer function also as a stress-relaxing layer for relaxing shrinkage stress caused at the time of curing of the ionizing radiation-curable resin for the formation of the ionizing radiation-cured resin constituting the top coat. Particularly preferably, the penetration-inhibiting coating has a yield strength of not less than 0.6 kgf, more preferably 0.6 to 3.0 kgf, and a breaking strength of not less than 1.0 kgf, more preferably 1.0 to 4.0 kgf. The yield strength and the breaking strength are measured in such a manner that two biaxially stretched polyethylene terephthalate film strips having a thickness of 50 μm and a width of 10 mm are laminated on top of the other through a 3 μm-thick primer layer so as for the end of one of the strips to overlap with the end of the other strip by 10 mm and, in this state, the two biaxially stretched polyethylene terephthalate film strips are pulled at a temperature of 70° C. in opposite directions.

EXAMPLES

Example A1

An impregnated paper GF601 manufactured by Kohjin Co., Ltd. was provided as a base paper for a decorative paper which is a decorative sheet common to examples and comparative examples. A woodgrain print was provided using an ink for a pattern (HAT ink, manufactured by The Inctec Inc.) at a coverage of 5 g/m² on one side of the base paper by gravure printing.

An acrylic resin (CFF primer, manufactured by Showa Ink Ind. Co., Ltd.) was coated at a coverage of 2 g/m² by gravure printing on the print layer to form a primer layer. Next, an electron beam-curable resin, which is a high crosslinking (average molecular weight between crosslinks: 150) ionizing radiation-curable resin and has the following composition, was coated by gravure reverse coating at a coverage of 20 g/m², followed by electron beam irradiation under conditions of acceleration voltage 175 kV and 5 Mrad to prepare a decorative sheet.

| (Electron beam-curable resin layer) | |
|---|---|
| Bifunctional acrylate monomer | 40 pts. wt. |
| Trifunctional acrylate monomer | 60 pts. wt. |
| Silicone acrylate | 1 pt. wt. |
| Silica | 20 pts. wt. |

Comparative Example A1

A decorative sheet was prepared in the same manner as in Example A1, except that the electron beam-curable resin layer was coated without the formation of the primer layer. For the electron beam-cured resin layer, the average molecular weight between crosslinks was 150, and the coverage was 20 g/m².

Comparative Example A2

After the formation of the primer layer, an ionizing radiation-curable resin (average molecular weight between crosslinks: 800) was used to prepare a decorative sheet.

| (Electron beam-curable resin layer) | |
|---|---|
| Urethane acrylate oligomer | 50 pts. wt. |
| Bifunctional acrylate monomer | 30 pts. wt. |
| Trifunctional acrylate monomer | 20 pts. wt. |
| Silicone acrylate | 1 pt. wt. |
| Silica | 20 pts. wt. |

Comparative Example A3

A decorative sheet was prepared in the same manner as in Example A1, except that the electron beam-curable resin layer was coated without the formation of the primer layer. For the electron beam-cured resin layer, the average molecular weight between crosslinks was 800.

Example A2

A blend of a butyral resin with a urethane resin (Bu Primer, manufactured by Showa Ink Ind. Co., Ltd.) was coated at a coverage of 2 g/m² by gravure printing on a print layer provided on a base paper to form a primer layer. In this under coat, the blending ratio of the butyral resin to the urethane resin was regulated to 1:1. Next, an electron beam-curable resin, which is a high crosslinking (average molecular weight between crosslinks 150) ionizing radiation-curable resin and has the same composition as described in Example A1, was coated and irradiated in the same manner as in Example A1. Thus, a decorative sheet was prepared.

Comparative Example A4

A decorative sheet was prepared in the same manner as in Example A2, except that the average molecular weight between crosslinks was 800.

For the decorative sheets prepared in Examples A1 and A2 and Comparative Examples A1 to A4, a cross-cut Cello-Tape adhesion test was carried out to evaluate the adhesion, and a test on resistance to staining was carried out according to JIS K 6902 to evaluate resistance to staining.

In the cross-cut Cello-Tape adhesion test, the surface of the decorative sheet was cut with a cutter at intervals of 2 mm to form cross-cuts of 10 divisions in each of lengthwise and widthwise directions, and a pressure-sensitive adhesive tape was applied onto and then separated from the surface of the decorative sheet. The application of the pressure-sensitive adhesive tape followed by the separation was repeated three times wherein, in each time, a fresh pressure-sensitive adhesive tape was used. Thereafter, the number of squares, wherein the coating remained unremoved, was counted.

In the test on resistance to staining, two test pieces having a suitable size were cut off from a decorative plate with a decorative sheet applied thereonto. A staining material (shoe polish was used here) was deposited on each facing, and the test pieces were allowed to stand for 24 hr. In this case, one of the test pieces was covered with a watch glass, while the other test piece was kept without any cover. Thereafter, these test pieces were washed with water, further washed with methyl alcohol or ethyl alcohol, wiped with dried clean gauze, and then allowed to stand for one hr. For these test pieces, a change in facing from the facing before the test was visually inspected. The results are shown in Table A1.

TABLE A1

|  |  | Ex. A1 | Ex. A2 | Comp. Ex. A1 | Comp. Ex. A2 | Comp. Ex. A3 | Comp. Ex. A4 |
|---|---|---|---|---|---|---|---|
| Layer construction | Primer layer | CFF | Bu | — | CFF | — | Bu |
|  | Electron beam-cured resin | 150 | 150 | 150 | 800 | 800 | 800 |
| Properties of primer layer | Average molecular weight | 20,000–30,000 | 5,000/2,000–2,500 | — | / | / | / |
|  | Yield strength, kgf | 1.05 | 1.07 | — | 1.05 | / | 1.07 |
|  | Breaking strength, kgf | 1.88 | 2.02 | — | 1.88 | / | 2.02 |
| Evaluation | Cello-Tape adhesion | 100/100 | 100/100 | 80/100 | 100/100 | 100/100 | 100/100 |
|  | Resistance to staining | Not stained | Not stained | Not stained | Stained | Stained | Stained |

Among the properties of the primer layer, the yield strength and the breaking strength are values obtained by measurement in such a manner that two biaxially stretched polyethylene terephthalate film strips having a thickness of 50 μm and a width of 10 mm were laminated on top of the other through a 3 μm-thick primer layer so as for the end of one of the strips to overlap with the end of the other strip by 10 mm and, in this state, the two biaxially stretched polyethylene terephthalate film strips are pulled at a temperature of 70° C. in opposite directions.

As is apparent from Table A1, when the ionizing radiation-cured resin layer has an average molecular weight between crosslinks of 150, no staining occurred in the test on resistance to staining, whereas when the ionizing radiation-cured resin layer has an average molecular weight between crosslinks of 800, staining occurred in the test on resistance to staining. Further, it should be noted that, in Comparative Example A1 wherein no under coat was provided, 20% of the squares (80/100) was separated in the Cello-Tape adhesion test, although the average molecular weight between crosslinks was 150. This demonstrates that the properties of the primer layer contribute greatly to improved adhesion.

As is apparent from the foregoing description, according to the decorative material of the present invention, the provision of a primer layer for relaxing shrinkage caused at the time of curing of an ionizing radiation-curable resin in the formation of a protective layer can realize the formation of a protective layer which has a high average molecular weight between crosslinks, possesses excellent resistance to staining, and does not pose any problem of unsatisfactory adhesion or the like.

Examples A3 to A7 and Comparative Examples A5 to A9

Decorative materials were prepared in the same manner as in Example A1, except that only the primer layer was changed. The decorative materials thus obtained were evaluated in the same manner as described above. For the primer layers, the chemical constitution, properties, and evaluation results of the primer layer are shown below. The tensile test of the primer layer was carried out in the same manner as described above.

TABLE A2

|  | Ex. A3 | Ex. A4 | Ex. A5 | Ex. A6 | Ex. A7 |
|---|---|---|---|---|---|
| Primer layer | Butyral/urethane system = 1/1 | Urethane/polyester system (1) = 1/1 | Urethane/polyester system (2) = 1/2 | Urethane system (1) | Acryl/urethane system = 1/1 |
| Average molecular weight | 5,000/2,000 | 30,000/3,000 | 30,000/3,000 | 20,000 | 28,000/3,000 |
| Yield stength, kgf | 1.10 | 1.71 | 2.40 | 1.65 | 2.05 |
| Breaking strength, kgf | 2.30 | 2.43 | 2.61 | 1.95 | 2.25 |
| Cello-Tape adhesion | 100/100 | 100/100 | 100/100 | 100/100 | 100/100 |

Compositions for the formation of the primer layers were as follows.

Example A3

Microsilica/butyral-urethane/mixed solvent=1/9.5-9.5/80

Example A4

Microsilica/urethane-polyester/anti-settling agent/mixed solvent=7.7/12-12/0.3/68

Example A5

Microsilica/urethane-polyester/anti-settling agent/mixed solvent =7.7/8-16/0.3/68

Example A6

Microsilica/urethane/anti-settling agent/mixed solvent=2/25/0.3/72.7

Example A7

Microsilica/acryl-urethane/anti-settling agent/mixed solvent=3/12-12/0.1/72.9

TABLE A3

|  | Comp. Ex. A5 | Comp. Ex. A6 | Comp. Ex. A7 | Comp. Ex. A8 | Comp. Ex. A9 |
|---|---|---|---|---|---|
| Primer layer | — | Urethane system (2) | Acryl/chlorinated vinyl acetate system = 1/1 | Nitrocellulose system | Acryl system |
| Average molecular weight | — | 35,000 | 28,000/18,000 | 40,000 | 30,000 |
| Yield stength, kgf, | — | 0.15 | 0.22 | 0.05 | 0.32 |
| Breaking strength, kgf | — | 0.23 | 0.40 | 0.67 | 0.70 |
| Cello-tape adhesion | 80/100 | 83/100 | 78/100 | 88/100 | 90/100 |

Compositions for the primer layers were as follows.

Comparative Example A6

Microsilica/urethane/mixed solvent=2/22/76

Comparative Example A7

Microsilica/acryl-chlorinated vinyl acetate/mixed solvent=1/9.8-9.8/79.4

Comparative Example A8

Microsilica/nitrocellulose/mixed solvent=1/21/78

Comparative Example A9

Microsilica/acryl/anti-settling agent/mixed solvent= 1/23/0.3/75.7

Example B1

A color solid print (which means even coating) layer and a woodgrain pattern layer were first formed by gravure printing using an ink composed mainly of an acrylic resin and nitrocellulose on a base paper for building materials (High Print 30 (basis weight 30 g/m$^2$), manufactured by Sanko Paper Manufacturing Corporation). Solid printing of a coating material having the following composition A was then carried out at a coverage of 3 g/m$^2$ on a dry basis on the woodgrain pattern layer.

| Composition A: | |
|---|---|
| Polyvinyl butyral resin | 50 pts. wt. |
| Silica | 0.5 pt. wt. |
| Solvent | 150 pts. wt. |

Subsequently, an ink prepared by adding, to an aminoalkyd resin ink as a base ink, 5% by weight of a silicone based on 100 parts by weight of the aminoalkyd resin and milling the mixture was used to form woodgrain vessel grooves in registry to the woodgrain pattern layer.

Finally, an electron beam-curable coating material having the following composition B was roll coated at a coverage of 7 g/m$^2$, followed by electron beam irradiation by means of an electron beam irradiation device under conditions of acceleration voltage 175 kV and dose 3 Mrad to prepare a decorative material wherein the electron beam-cured coating material is in a concave form on the goodgrain vessel grooves.

| Composition B: | |
|---|---|
| TMPTA (trimethylolpropane triacrylate) | 90 pts. wt. |
| Silica | 9 pts. wt. |
| Silicone acrylate | 1 pt. wt. |

Example B2

A decorative material was prepared in the same manner as in Example B1, except that a coating material having the following composition C was used instead of the coating material having the composition A.

| Composition C: | |
|---|---|
| Polyvinyl butyral resin | 50 pts. wt. |
| Acrylic polyol | 30 pts. wt. |
| Curing agent (isocyanate) | 5 pts. wt. |
| Silica | 0.5 pt. wt. |
| Solvent | 150 pts. wt. |

Example B3

A decorative material was prepared in the same manner as in Example B1, except that a coating material having the following composition D was used instead of the coating material having the composition A.

| Composition D: | |
|---|---|
| Acrylate prepolymer | 50 pts. wt. |
| Solvent | 150 pts. wt. |

Comparative Example B1

A decorative material was prepared in the same manner as in Example B1, except that the formation of the solid print layer using the coating material having the composition A was omitted.

Comparison of Effect of Examples B1 to B3 with that of Comparative Example B1

For the decorative materials prepared in Examples B1 to B3 and Comparative Example B1, the average depth of vessel grooves in the decorative material was as shown in the following Table B1. As is apparent from Table B1, in the examples wherein a penetration-inhibiting coating was provided, deep concaves were formed, whereas in the comparative example wherein the penetration-inhibiting coating was not provided, the depth of the concaves was too small to visually distinguish the concaves from the other portions.

TABLE B1

| | Depth of concaves after curing of coating |
|---|---|
| Ex. B1 | 5 μm |
| Ex. B2 | 5 μm |
| Ex. B3 | 5 μm |
| Comp. Ex. B1 | 1 μm |

Example B4

A colored solid print layer and a pattern layer were formed by an ink using a two-component curable polyurethane resin as a binder (UE two component system, manufactured by Showa Ink Ind. Co., Ltd.) on a base paper for building materials (GF 606 (thickness 60 μm), manufactured by Kohjin Co., Ltd.). Solid printing of the coating material having the composition C ("Table 3") was carried out at a coverage of 3 g/m² on a dry basis on the pattern layer by using two solid plates having a depth of 54 μm. In all the above cases, gravure printing was carried out. After solid printing, the print was dried at 160° C. for 30 sec.

Subsequently, an ink prepared by adding, to an aminoalkyd resin ink as a base ink, 5% by weight of a silicone based on 100 parts by weight of the aminoalkyd resin and milling the mixture (manufactured by The Inctec Inc.) was used to form a line pattern.

Finally, an electron beam-curable coating material having the following composition E (SE-40, manufactured by Sanyo Chemical Industries, Ltd.) was gravure coated at a coverage of 25 g/m², followed by electron beam irradiation by means of an electron beam irradiation device under conditions of acceleration voltage 175 kV and dose 3 Mrad to prepare a decorative material wherein the electron beam-cured coating material was in a concave form on the line pattern print portion.

| Composition E: | |
|---|---|
| Bifunctional monomer (A) | 49.5 pts. wt. |
| Trifunctional monomer (B) | 16.5 pts. wt. |
| Adhesion-imparting monomer (C) | 0.5 pt. wt. |
| Dispersant | 1.5 pts. wt. |
| Alumina (diameter 25 μm) | 22.0 pts. wt. |
| Silica (diameter 1.8 μm) | 10.0 pts. wt. |

In the above composition, the bifunctional monomer (A), the trifunctional monomer (B), and the adhesion-imparting monomer (C) are as follows.

TABLE B2

(A) $CH_2=CH-COO(CH_2CH_2O)_2PC(CH_3)_2-P(OCH_2CH_2)_2OCOCH=CH_2$ wherein P in (A) represents a phenylene group.

TABLE B2-continued (B) $CH_2CH_2C(CH_2OCHCH_2OCOCH=CH)$ with $CH_3$ substituent (C) $CH_2=C(CH_3)-COOCH_2CH_2\,O-P(=O)(OH)_2$ wherein P in (C) represents phosphorus.

Comparative Example B2

A decorative material was prepared in the same manner as in Example B4, except that alumina and silica were removed from the electron beam-curable coating material having the composition E.

Comparative Example B3

A decorative material was prepared in the same manner as in Example B4, except that solid printing using the coating material having the composition C was not carried out.

Comparison of Effect of Example B4 with that of Comparative Examples B2 and B3

For decorative materials prepared in Example B4 and Comparative Examples B2 and B3, the solvent resistance, the abrasion resistance, and the design effect (=state of concaves) were compared. The results are shown in Table B3.

For the evaluation of the solvent resistance, cotton wound around a weight (1 kg) was impregnated with methyl ethyl ketone, and wiped the decorative material to determine the number of times of wiping required for the ink to be captured by the cotton. For the evaluation of the abrasion resistance, the decorative material was abraded by a tapered abraser (=an abrasion tester) to determine the number of times of abrasion required for 50% of the print pattern to be removed. As is apparent from Table B3, the presence of alumina and silica in the surface layer contributes to the abrasion resistance.

TABLE B3

| | Solvent resistance | Abrasion resistance | Design effect |
|---|---|---|---|
| Ex. B4 | 1,000 times | 600 times | Deep |
| Comp. Ex. B2 | 1,000 times | 60 times | Deep |
| Comp. Ex. B3 | 100 times | 500 times | Somewhat shallow |

Example B5

A colored solid print layer and a pattern layer were formed by an ink using a two-component curable polyurethane resin as a binder (UE two component system, manufactured by Showa Ink Ind. Co., Ltd.) on a tissue paper for building materials (FLEX 30, thickness 30 μm, manufactured by Sanko Paper Manufacturing Corporation). Solid printing of a coating composition comprising an unsaturated polyester resin (electron beam-curable) component and a two-component curable polyurethane resin-forming component (Primer Set No. 1, manufactured by The Inctec Inc.) was then carried out at a coverage of 3 g/m² on a dry basis on the pattern layer by using two solid plates having a depth of 54 μm.

Subsequently, an ink prepared by adding, to an aminoalkyd resin ink as a base ink, 5% by weight of a silicone based on 100 parts by weight of the aminoalkyd resin and milling the mixture was used to form a line pattern. In all the above cases, gravure printing was carried out. After printing, the print was dried at 160° C. for 30 sec.

Finally, an electron beam-curable resin coating material (EB 256, manufactured by Dainichiseika Color & Chemicals Manufacturing. Co., Ltd.) was gravure printed at a coverage of 5 g/m² on a dry basis on the printed face, followed by electron beam irradiation under conditions of acceleration voltage 175 kV and dose 3 Mrad to prepare a decorative material wherein coating was in a concave form on the line pattern print portion.

Example B6

A decorative material was prepared in the same manner as in Example B5, except that an ink using an acrylic resin and nitrocellulose as binders (HAT, manufactured by The Inctec Inc.) was used as the ink for the formation of the colored solid print layer and the pattern layer.

Example B7

A decorative material was prepared in the same manner as in Example B5, except that solid printing on the pattern layer was carried out using a two-component curable coating composition composed mainly of a polyurethane resin and trimethylolpropane triacrylate.

Comparative Example B4

A decorative material was prepared in the same manner as in Example B5, except that only solid printing was omitted.

Comparative Example B5

A decorative material was prepared in the same manner as in Example B5, except that the line pattern was formed using an electron beam-curable ink composition.

Comparative Example B6

A decorative material was prepared in the same manner as in Example B5, except that both the solid printing and the final coating were carried out using a coating composition composed mainly of a polyurethane resin.

Comparison of Effect of Examples B5 to B7 with that of Comparative Examples B4 to B6

For decorative materials prepared in Examples B5 to B7 and Comparative Examples B4 to B6, the adhesion, scratch resistance, solvent resistance, and design effect of the surface coating were compared. The results are shown in Table B4.

For the evaluation of the adhesion of the surface coating, cross-cuts were formed on the surface of the decorative material at intervals of 2 mm with a cutter knife. Cello-Tape (manufactured by Nichiban Co., Ltd.) was applied onto cross-cut formed portions, followed by a peel test three times. When the surface coating was separated, the adhesion of the surface coating was evaluated as X, while, when the surface coating was not separated, the adhesion of the surface coating was evaluated as ○.

For the evaluation of the scratch resistance, the surface coating was covered with steel wool, and the surface coating was then inspected for scratch. When there was a scratch, the scratch resistance was evaluated as X, while, when there was no scratch, the scratch resistance was evaluated as ○.

For the evaluation of the solvent resistance, cotton wound around a weight (1 kg) was impregnated with methyl ethyl ketone, and the decorative material was wiped with the above cotton to determine the number of times of wiping required for the ink to be captured by the cotton.

For the design effect, when the shape of the concaves was sharp, the design effect was evaluated as ○; when the shape of the concaves was not sharp, the design effect was evaluated as Δ; and, when cissing was unsatisfactory, the design effect was evaluated as X. As is apparent from Table B4, the decorative material of Comparative Example B6, wherein solid printing of the coating composition composed mainly of a polyurethane resin was carried out on the pattern layer, had poor abrasion resistance and solvent resistance.

TABLE B4

|  | Adhesion | Scratch resistance | Solvent resistance | Design effect |
|---|---|---|---|---|
| Ex. B5 | ○ | ○ | 300 times | ○ |
| Ex. B6 | ○ | ○ | 250 times | ○ |
| Ex. B7 | ○ | ○ | 300 times | ○ |
| Comp. Ex. B4 | ○ | ○ | 100 times | Δ |
| Comp. Ex. B5 | ○ | ○ | 250 times | X |
| Comp. Ex. B6 | ○ | X | 100 times | ○ |

Example C1

A colored solid print layer and a pattern layer were printed using a gravure ink comprising an acryl-nitrocellulose mixed system as a binder (HAT, manufactured by The Inctec Inc.) on a 30 'm-thick tissue paper for building materials (FLEX 30, manufactured by Sanko Paper Manufacturing Corporation). Next, solid (2 μm) printing (twice) of 54 lines was carried out using BUB primer (two component system) having the following composition A, manufactured by Showa Ink Ind. Co., Ltd. to form a sealer layer.

<Composition A>

Main component: butyral/acrylic polyol/silica=10/5/1

Curing agent: isocyanate

Main component/curing agent=100 parts/5 parts

Next, EB 256 (manufactured by Dainichiseika Color & Chemicals Manufacturing Co., Ltd.) having the following composition B was gravure printed at a coverage of 5 g/m² on a dry basis on the sealer layer, followed by electron beam irradiation at 3 Mrad (175 kV) to form a top layer on the sealer layer. Thus, a decorative sheet was prepared.

<Composition B>

Ionizing radiation-curable resin: Acrylate monomer

Matting agent: Silica (average particle diameter 7 μm)

Lubricant: Silicone acrylate, silicone oil, wax

Ionizing radiation-curable resin/matting agent/lubricant=100 parts/15 parts/10 parts

Example C2

A decorative sheet was prepared in the same manner as in Example C1, except that the amount of silica in "EB 256" was changed to 5 parts.

Comparative Example C1

A decorative sheet was prepared in the same manner as in Example C1, except that the sealer layer was not formed.

Comparative Example C2

A decorative sheet was prepared in the same manner as in Example C1, except that "EB 256" was coated to a thickness of 10 μm.

Comparative Example C3

A decorative sheet was prepared in the same manner as in Example C1, except that the average particle diameter of the silica in "EB 256" was changed to 12 µm and the "EB 256" was coated to a thickness of 10 µm.

Comparative Example C4

A decorative sheet was prepared in the same manner as Example C1, except that the average particle diameter of the silica in "EB 256" was changed to 10 µm and the WEB 256" was coated to a thickness of 5 µm.

Comparative Example C5

A decorative sheet was prepared in the same manner as in Example C1, except that silica was omitted from "BUB primer (two component system)."

Results of Test on Properties

For the decorative sheets prepared in Examples C1 and C2 and Comparative Examples C1 to C5, the coefficient of dynamic friction and gloss (75 degrees) were measured, and the abrasion resistance was evaluated by a JAS special plywood C test. In this test, a soft abrasion wheel CS17 was measured under a load of 1,000 g to determine the number of times required for the half of the pattern to be removed. The results were as shown in Table C1.

TABLE C1

| Sample | Coefficient of dynamic friction | Gloss, 75° | Abrasion resistance |
|---|---|---|---|
| Ex. C1 | 0.40 | 30 | 1,000 times |
| Ex. C2 | 0.35 | 50 | 1,000 times |
| Comp. Ex. C1 | 0.80 | 20 | 300 times |
| Comp. Ex. C2 | 0.20 | 80 | 1,600 times |
| Comp. Ex. C3 | 0.75 | 30 | 1,600 times |
| Comp. Ex. C4 | 0.90 | 30 | 1,000 times |
| Comp. Ex. C5 | 0.40 | 70 | 1,000 times |

As is apparent from Table C1, when the gloss (75 degrees) of the top layer was in the range of 10 to 50, the abrasion resistance was also good in the case of a coefficient of dynamic friction of 0.3 to 0.6.

As described above, according to the present invention, in the decorative sheet having a top layer of a crosslinked resin, the provision of a sealer layer underlying the top layer formed of a crosslinked resin, when the gloss (75 degrees) of the top layer formed of a crosslinked resin was in the range of 10 to 50 while regulating the coefficient of dynamic friction in the range of 0.3 to 0.6, decorative sheets can be provided which have improved slipperiness while enjoying good matting.

Example D1

A 30 µm-thick tissue paper for building materials (FLES 30, manufactured by Sanko Paper Manufacturing Corporation) was provided as a paper substrate. Solid printing (2 µm) (twice) of 54 screen lines were carried out using a primer comprising a urethane crosslinkable resin as a binder [AFS (two component system), manufactured by Showa Ink Ind. Co., Ltd.] on the paper substrate to form a sealer layer. Next, a colored solid print layer and a pattern layer were printed, on the sealer layer, using a gravure ink comprising a urethane crosslinkable resin as a binder [UE (two component system), manufacture by Showa Ink Ind. Co., Ltd.]. Solid printing (2 µm) (twice) of 54 screen lines were carried out using a sealer comprising a butyral urethane crosslinkable resin [FE Sealer (two component system), manufactured by Showa Ink Ind. Co., Ltd.] as a binder on the print layer to form a sealer layer, followed by aging at 70° C. for 24 hr. Subsequently, an ink having the following composition (EB 256, manufactured by Dainichiseika Color & Chemicals Manufacturing. Co., Ltd.) was gravure printed to a thickness of 5 µm. The assembly was then irradiated with an electron beam at 3 Mrad (175 kV) to form a top layer on the sealer layer. Thus, a contemplated decorative sheet was prepared.

<Composition>
Ionizing radiation-curable resin: Acrylate monomer
Matting agent: Silica (average particle diameter 7 µm)
Lubricant: Silicone acrylate, silicone oil, wax Ionizing radiation-curable resin/matting agent/lubricant=100 parts/ 15 parts/10 parts

Example D2

A contemplated decorative sheet was prepared in the same manner as in Example D1, except that the ink for the print layer was changed. In this example, the colored solid print layer and the pattern layer were printed using a gravure ink comprising a nitrocellulose as a binder (SA, manufactured by Showa Ink Ind. Co., Ltd.).

Comparative Example D1

A print layer was formed directly on a 30 µm-thick tissue paper for building materials (FLEX 30, manufactured by Sanko Paper Manufacturing Corporation) without the provision of a sealer layer. In this example, a colored solid print layer and a pattern layer were printed using a gravure ink comprising a nitrocellulose alkyd as a binder (SA, manufactured by Showa Ink Ind. Co., Ltd.). The ink having the above composition (EB 256, manufactured by Dainichiseika Color & Chemicals Manufacturing. Co., Ltd.) was gravure printed to a thickness of 5 µm on the print layer without the provision of a sealer layer, followed by electron beam irradiation at 3 Mrad (175 kV) to form a top layer on the sealer layer. Thus, a decorative sheet was prepared.

Comparative Example D2

A decorative sheet was prepared in the same manner as in Comparative Example D1, except that a 60 µm-thick impregnated tissue paper for building materials (GF 606, manufactured by Kohjin Co., Ltd.) was provided as the paper substrate.

Comparative Example D3

A print layer was formed directly on a 30 µm-thick tissue paper for building materials (FLEX 30, manufactured by Sanko Paper Manufacturing Corporation) without the provision of a sealer layer. In this example, a colored solid print layer and a pattern layer were printed using a gravure ink comprising a urethane crosslinkable resin as a binder [UE (two component system), manufacture by Showa Ink Ind. Co., Ltd.]. As with Example D1, solid printing (2 µm) (twice) of 54 screen lines were carried out using a sealer comprising a butyral urethane crosslinkable resin as a binder [FE Sealer (two component system), manufactured by Dainichiseika Color & Chemicals Manufacturing. Co., Ltd.] on the print layer, followed by aging at 70° C. for 24 hr. Subsequently, an ink having the above composition [EB 256, manufactured by Dainichiseika Color & Chemicals Manufacturing. Co., Ltd.] was gravure coated to a thickness of 5 µm. The assembly was then irradiated with an electron beam at 3 Mrad (175 kV) to form a top layer on the sealer layer. Thus, a decorative sheet was prepared.

Comparative Example D4

A decorative sheet was prepared in the same manner as in Example D1, except that a sealer layer was formed using a primer containing 30 parts of paraffin wax added to "AFS" (two component system) manufactured by Showa Ink Ind. Co., Ltd.].

Comparative Example D5

A decorative sheet was prepared in the same manner as in Example D2, except that the sealer layer formed of FE sealer (two component system) manufactured by Dainichiseika Color & Chemicals Manufacturing. Co., Ltd. was not provided.

Comparative Example D6

A decorative sheet was prepared in the same manner as in Example D2, except that silica as the matting agent in "EB 256" manufactured by Dainichiseika Color & Chemicals Manufacturing. Co., Ltd. was changed to an untreated product.

Results of Test on Properties

The decorative sheets prepared in Examples D1 and D2 and Comparative Examples D1 to D6 were laminated onto a particle board (thickness 25 mm) through a urea adhesive. These laminated decorative sheets were evaluated for adhesion and moisture permeability. The results are shown in Table D1. All the decorative sheets except for the decorative sheet prepared in Comparative Example D2 had a total thickness of not more than 50 μm which posed no problem associated with handling in terms of thickness.

TABLE D1

| | Adhesion | Moisture permeability, g/m$^2$ | Thickness, μm |
|---|---|---|---|
| Ex. D1 | ○ | 400 | 44 |
| Ex. D2 | ○ | 500 | 44 |
| Comp. Ex. D1 | ○ | 1,300 | 40 |
| Comp. Ex. D2 | ○ | 800 | 70 |
| Comp. Ex. D3 | ○ | 900 | 42 |
| Comp. Ex. D4 | X | 300 | 44 |
| Comp. Ex. D5 | ○ | 1,000 | 42 |
| Comp. Ex. D6 | ○ | 700 | 44 |

For the "adhesion," cross-cuts were formed at intervals of 2 mm by means of a cutter, and a peel test was carried out three times using Cello-Tape (manufactured by Nichiban Co., Ltd.). ○ represents that separation did not occur, and X represents that separation occurred. The "moisture permeability" was measured by the JIS Cup method (40° C., 90%). It is apparent that the decorative sheets prepared in Examples D1 and D2 had a moisture permeability after 24 hr of not more than 600 g/m$^2$ as measured by the JIS Cup method, indicating that these decorative sheets satisfied a water resistance requirement for use in places where water is used.

As is apparent from the foregoing description, the decorative sheet of the present invention comprises a paper substrate and, stacked on the paper substrate in the following order, at least a sealer layer, a print layer, a sealer layer, and a crosslinked resin top layer and has a total thickness of not more than 50 μm. By virtue of this construction, the decorative sheet of the present invention poses no problem associated with handling in terms of thickness and, in addition, has good water resistance without sacrificing the adhesion of substrates and the adhesion to printing inks.

Examples E1 and E2

A pattern was gravure printed using a gravure ink onto a tissue paper (30 g/m$^2$). An electron beam-curable resin [urethane acrylate oligomer:polyester acrylate oligomer: polyfunctional monomer:monofunctional monomer= 10:20:40:30 (weight ratio)] was roll coated at a coverage of 15 g/m$^2$ onto the pattern layer. The coating of the electron beam-curable resin was then irradiated with an electron beam under conditions of 175 kV and 5 Mrad to cure the electron beam-curable resin layer, thereby forming a protective layer. Thus, a decorative sheet of Example E1 was prepared. The procedure used in Example E1 was repeated, except that the dose in the electron beam irradiation was changed to 3 Mrad. Thus, a decorative sheet of Example E2 was prepared. The decorative sheets of these examples were hot laminated at 170° C. onto a particle board with the aid of a vinyl acetate adhesive (manufactured by Konishi Co., Ltd.). Thus, decorative materials of Examples E1 and E2 were prepared. For the decorative materials and the decorative sheets before the lamination in Examples E1 and E2, the gloss was measured with a Gardner 75-degree gloss meter.

The gloss of the decorative sheet before lamination and the gloss of the decorative material after lamination in Examples E1 and E2 are shown in Table E1.

Comparative Example E1

A decorative sheet and a decorative material of Comparative Example 1 were prepared in the same manner as in Example E1, except that the dose in the electron beam irradiation was changed to 1 Mrad. The gloss of the decorative sheet before lamination and the gloss of the decorative material after lamination in Comparative Example E1 are shown in Table E1.

Comparative Example E2

A pattern was gravure printed using a gravure ink on a tissue paper (30 g/m$^2$). A protective layer was then formed on the pattern layer from a two-component curable urethane (KR-94 (tradename), manufactured by The Inctec Inc.) to prepare a decorative sheet of Comparative Example E2. A decorative material of Comparative Example E2 was prepared in the same manner as in Example E1, except that the decorative sheet of Comparative Example E2 was used. The gloss of the decorative sheet before lamination and the gloss of the decorative material after lamination in Comparative Example E2 are shown in Table E1.

TABLE E1

| | Type of resin | Dose of electron beam | Gloss before lamination | Gloss after lamination |
|---|---|---|---|---|
| Ex. E1 | Electron beam-curable resin | 5 Mrad | 95 | 93 |
| Ex. E2 | Electron beam-curable resin | 3 Mrad | 95 | 90 |
| Comp. Ex. E1 | Electron beam-curable resin | 1 Mrad | 95 | 80 |
| Comp. Ex. E2 | Urethane (two component system) | | 95 | 70 |

Since the maximum temperature, at which the decorative sheets according to the present invention can withstand, is 170° C., the decorative sheets, even when exposed to heat of up to 170° C. during hot lamination, do not lose the surface gloss. Thus, according to the present invention, decorative sheets and decorative materials having high design effect can be provided.

Example F1

A resin-impregnated paper for inhibiting the penetration of a coating composition for a top coat and improving paper strength [GF 606 (basis weight 60 g), manufactured by Kohjin Co., Ltd.] was provided as a substrate sheet. A resin composed mainly of a butyral resin was coated onto the substrate sheet to form a primer layer.

A colored solid print layer, a pattern layer, and a woodgrain vessel layer were gravure printed in that order on the surface of the primer layer to form a woodgrain pattern. In this case, an ink, for paper, comprising a blend of an acrylic resin with a nitrocellulose resin (HAT, manufactured by The Inctec Inc.) was used. Subsequently, a substantially transparent ink containing a plastisol of a polyvinyl chloride resin and trimethylolpropane triacrylate as a crosslinking agent (Sol 100 Medium, manufactured by The Inctec Inc.) was printed in portions other than the woodgrain vessels by means of a plate having a plate depth of 120 μm on the same printing machine, followed by drying and winding. Thereafter, an electron beam-curable resin coating material was roll coated onto the whole surface of the print, followed by electron beam irradiation to form a 25 μm-thick surface protective layer. In the decorative material thus obtained, the woodgrain vessel portion is matte, while portions other than the vessel portion have a smooth surface and thus is glossy. This provided a feeling such that the vessel portion is concave.

Example F2

A decorative material was prepared in the same manner as in Example F1, except that the electron beam-curable resin coating material contained 20%, based on the resin component, of spherical α-alumina particles.

The decorative material thus obtained could withstand 600-time continuous abrasion in the abrasion resistance test.

Example F3

A resin-impregnated paper for inhibiting the penetration of a coating composition for a top coat and improving paper strength [GF 606 (basis weight 60 g), manufactured by Kohjin Co., Ltd.] was provided as a substrate sheet. A resin composed mainly of a blend of a polyester resin with a urethane resin was coated onto the substrate sheet to form a primer layer.

Printing of a colored solid print layer, printing of a pattern layer, and printing of a woodgrain vessel layer were gravure printed in that order on the surface of the primer layer to form a woodgrain pattern. In this case, an ink, for paper, comprising a blend of an acrylic resin with a nitrocellulose resin (HAT, manufactured by The Inctec Inc.) was used. Subsequently, a substantially transparent ink containing a plastisol of a polyvinyl chloride resin and trimethylolpropane triacrylate as a crosslinking agent (Sol 100 Medium, manufactured by The Inctec Inc.) was printed in portions other than the woodgrain vessels by means of a plate having a plate depth of 120 μm on the same printing machine, followed by drying and winding. Thereafter, an electron beam-curable resin coating material was roll coated onto the whole surface of the print, followed by electron beam irradiation to form a 25 μm-thick surface protective layer. In the decorative material thus obtained, the woodgrain vessel portion is matte, while portions other than the vessel portion have a smooth surface and thus is glossy. This provided a feeling such that the vessel portion is concave.

Example F4

A decorative material was prepared in the same manner as in Example F3, except that the electron beam-curable resin coating material contained 20%, based on the resin component, of spherical α-alumina particles.

The decorative material thus obtained could withstand 600-time continuous abrasion in the abrasion resistance test.

According to the above embodiments of the present invention, printing of convexes, in the concaves and convexes, by means of one additional cylinder roller, which is different from the plate for the conventional pattern formation, suffices for satisfactory results. Therefore, the printing machine is less likely to impose a restriction. Further, according to the present invention, concaves are separated from convexes by merely forming a pattern having lower air permeability on the convexes. This can eliminate the difficulty encountered in registration. Further, since the conventional pattern and the convex pattern can be continuously formed, the registration also can be relatively easily done. Furthermore, according to the present invention, since the protective layer is continuous, the function of protecting the surface is satisfactory. When the protective layer is formed using an ionizing radiation-curable resin composition, the physical and chemical properties of the outermost surface can be improved. Further, the incorporation of spherical particles having high hardness typified by spherical alumina in the protective layer can offer further improved abrasion resistance by virtue of the action of the spherical particles.

What is claimed is:

1. A decorative material comprising:
    a substrate;
    a print layer provided on the substrate;
    a protective layer provided on the print layer, the protective layer comprising an ionizing radiation-cured resin; and
    a stress relaxing layer as a primer layer provided between the print layer and the protective layer, for relaxing shrinkage stress caused at the time of curing of an ionizing radiation-curable resin for the formation of the ionizing radiation-cured resin constituting the protective layer.

2. The decorative material according to claim 1, wherein the primer layer has a thickness of 1 to 5 μm.

3. The decorative material according to claim 1, wherein the ionizing radiation-cured resin has an average molecular weight between crosslinks of 100 to 200.

4. The decorative material according to claim 1, wherein the ionizing radiation-curable resin is an electron beam-curable resin.

5. The decorative material according to claim 1, wherein the primer layer has a yield strength of not less than 0.6 kgf and a breaking strength of not less than 1.0 kgf, the yield strength and the breaking strength having been measured in such a manner that two biaxially stretched polyethylene terephthalate film strips having a thickness of 50 μm and a width of 10 mm are laminated on top of the other through a 3 μm-thick primer layer so as for the end of one of the strips to overlap with the end of the other strip by 10 mm and, in this state, the two biaxially stretched polyethylene terephthalate film strips are pulled at a temperature of 70° C. in opposite directions.

6. The decorative material according to claim 5, wherein the primer layer has a yield strength of 0.6 to 3.0 kgf and a breaking strength of 1.0 to 4.0 kgf.

7. A decorative material comprising:
a substrate penetrable with an ionizing radiation-Curable resin composition;
a penetration-inhibiting coating provided on the substrate, for inhibiting the penetration of the ionizing radiation-curable resin composition;
a cissing pattern provided on the penetration-inhibiting coating, for repelling the ionizing radiation-curable resin composition; and
a top coat provided on the penetration-inhibiting coating including the cissing pattern, the top coat comprising an ionizing radiation-cured resin composition, concaves being defined by the top coat, the concaves having been formed as a result of cissing of the ionizing radiation-curable resin composition from on the cissing pattern in the course of the formation of the top coat from the ionizing radiation-curable resin composition, said penetration-inhibiting coating also functioning as a stress-relaxing layer for relaxing shrinkage stress caused at the time of curing of the ionizing radiation-curable resin for the formation of the top coat.

8. The decorative material according to claim 7, wherein the penetration-inhibiting coating has been formed from a composition composed mainly of an oil-resistant resin.

9. The decorative material according to claim 8, wherein the oil-resistant resin is selected from the group consisting of a polyvinylbutyral resin, a polyvinyl alcohol resin, an acrylic resin, and a mixture of at least one of said resins with a thermosetting resin.

10. The decorative material according to claim 8, wherein the oil-resistant resin comprises a thermosetting resin and an ionizing radiation-curable prepolymer, oligomer, or monomer.

11. The decorative material according to claim 7, wherein the top coat contains spherical particles.

12. The decorative material according to claim 11, wherein the diameter of the spherical particles is 30 to 200% of the thickness of the top coat.

13. The decorative material according to claim 7, wherein the penetration-inhibiting coating has a yield strength of not less than 0.6 kgf and a breaking strength of not less than 1.0 kgf, the yield strength and the breaking strength having been measured in such a manner that two biaxially stretched polyethylene terephthalate film strips having a thickness of 50 μm and a width of 10 mm are laminated on top of the other through a 3 μm-thick penetration-inhibiting coating so as for the end of one of the strips to overlap with the end of the other strip by 10 mm and, in this state, the two biaxially stretched polyethylene terephthalate film strips are pulled at a temperature of 70° C. in opposite directions.

14. The decorative material according to claim 13, wherein the penetration-inhibiting coating has a yield strength of 0.6 to 3.0 kgf and a breaking strength of 1.0 to 4.0 kgf.

15. A decorative material comprising:
substrate formed of paper;
a print layer provided on the substrate;
a sealer layer provided on the print layer; and
a top coat provided on the sealer layer, the top coat comprising an ionizing radiation-curable resin,
the top coat being regulated to a coefficient of dynamic friction of 0.3 to 0.6 in the gloss (75 degrees) range of 10 to 50, said sealer layer also functioning as a stress-relaxing layer for relaxing shrinkage stress caused at a time of curing of the ionizing radiation-curable resin for the formation of the top coat.

16. The decorative material according to claim 15, wherein the print layer comprises a colored solid layer and/or a pattern layer.

17. The decorative material according to claim 15, wherein the sealer layer contains a matting agent.

18. The decorative material according to claim 15, wherein the sealer layer has a yield strength of not less than 0.6 kgf and a breaking strength of not less than 1.0 kgf, the yield strength and the breaking strength having been measured in such a manner that two biaxially stretched polyethylene terephthalate film strips having a thickness of 50 μm and a width of 10 mm are laminated on top of the other through a 3 μm-thick sealer layer so as for the end of one of the strips to overlap with the end of the other strip by 10 mm and, in this state, the two biaxially stretched polyethylene terephthalate film strips are pulled at a temperature of 70° C. in opposite directions.

19. The decorative material according to claim 18, wherein the sealer layer has a yield strength of 0.6 to 3.0 kgf and a breaking strength of 1.0 to 4.0 kgf.

20. A decorative material comprising
a substrate formed of paper;
a first sealer layer provided on the substrate;
a print layer provided on the first sealer layer;
a second sealer layer provided on the print layer; and
a top coat provided on the second sealer layer, the top coat comprising an ionizing radiation-curable resin,
the total thickness of the layers being not more than 50 μm, said first and second sealer layers also functioning as a stress-relaxing layer for relaxing shrinkage stress caused at the time of curing of the ionizing radiation-curable resin for the formation of the top coat.

21. The decorative material according to claim 20, which has a moisture permeability after 24 hr of not more than 600 g/m² as measured according to the cup method specified in JIS (Japanese Industrial Standards).

22. The decorative material according to claim 20, wherein the top coat contains a water-repellent material.

23. The decorative material according to claim 20, wherein the topcoat contains a hydrophobic silica.

24. The decorative material according to claim 20, wherein the first sealer layer comprises a crosslinked resin.

25. The decorative material according to claim 20, wherein the first sealer layer has a yield strength of not less than 0.6 kgf and a breaking strength of not less than 1.0 kgf, the yield strength and the breaking strength having been measured in such a manner that two biaxially stretched polyethylene terephthalate film strips having a thickness of 50 μm and a width of 10 mm are laminated on top of the other through a 3 μm-thick sealer layer so as for the end of one of the strips to overlap with the end of the other strip by 10 mm and, in this state, the two biaxially stretched polyethylene terephthalate film strips are pulled at a temperature of 70° C. in opposite directions.

26. The decorative material according to claim 20, wherein the first sealer layer has a yield strength of 0.6 to 3.0 kgf and a breaking strength of 1.0 to 4.0 kgf.

27. The decorative material according to claim 1, wherein the protective layer has a maximum temperature, at which the protective layer can withstand, of 170° C.

28. The decorative material according to claim 7, wherein the top coat has a maximum temperature, at which the protective layer can withstand, of 170° C.

29. The decorative material according to claim 27, wherein the decorative material has a surface gloss of not less than 90 as measured with a Gardner 75-degree gloss meter.

30. The decorative material according to claim 1, wherein the print layer comprises a pattern having lower air permeability than the other portions and has, on its whole surface, the protective layer.

31. The decorative material according to claim 30, wherein the protective layer contains high-hardness spherical particles for improving abrasion resistance.

32. The decorative material according to claim 31, wherein the high-hardness spherical particles are spherical α-alumina.

33. The decorative material according to claim 30, wherein concaves and convexes consistent with the pattern having lower air permeability are provided on the surface of the decorative material.

34. The decorative material according to claim 20, wherein the second sealer layer comprises a crosslinked resin.

35. The decorative material according to claim 20, wherein both the first sealer layer and the second sealer layer comprise a crosslinked resin.

36. The decorative material according to claim 20, wherein the second sealer layer has a yield strength of not less than 0.6 kgf and a breaking strength of not less than 1.0 kgf, the yield strength and the breaking strength having been measured in such a manner that two biaxially stretched polyethylene terephthalate film strips having a thickness of 50 μm and a width of 10 mm are laminated on top of the other through a 3 μm-thick sealer layer so as for the end of one of the strips to overlap with the end of the other strip by 10 mm and, in this state, the two biaxially stretched polyethylene terephthalate film strips are pulled at a temperature of 70° C. in opposite directions.

37. The decorative material according to claim 20, wherein both the first sealer layer and the second sealer layer have a yield strength of not less than 0.6 kgf and a breaking strength of not less than 1.0 kgf, the yield strength and the breaking strength having been measured in such a manner that two biaxially stretched polyethylene terephthalate film strips having a thickness of 50 μm and a width of 10 mm are laminated on top of the other through a 3 μm-thick sealer layer so as for the end of one of the strips to overlap with the end of the other strip by 10 and, in this state, the two biaxially stretched polyethylene terephthalate film strips are pulled at a temperature of 70° C. in opposite directions.

38. The decorative material according to claim 20, wherein the second sealer layer has a yield strength of 0.6 to 3.0 kgf and a breaking strength of 1.0 to 4.0 kgf.

39. The decorative material according to claim 20, wherein both the first sealer layer and the second sealer layer have a yield strength of 0.6 to 3.0 kgf and a breaking strength of 1.0 to 4.0 kgf.

* * * * *